(12) United States Patent
Getchius

(10) Patent No.: US 7,908,261 B2
(45) Date of Patent: *Mar. 15, 2011

(54) METHOD AND APPARATUS FOR CONTEXT BASED QUERYING

(75) Inventor: Jeffrey M. Getchius, Cambridge, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 323 days.

This patent is subject to a terminal disclaimer.

(21) Appl. No.: 11/246,368

(22) Filed: Oct. 11, 2005

(65) Prior Publication Data

US 2006/0282412 A1 Dec. 14, 2006

Related U.S. Application Data

(63) Continuation of application No. 10/084,390, filed on Feb. 27, 2002, now Pat. No. 6,976,017.

(60) Provisional application No. 60/276,505, filed on Mar. 19, 2001, provisional application No. 60/275,719, filed on Mar. 13, 2001, provisional application No. 60/275,667, filed on Mar. 13, 2001, provisional application No. 60/275,031, filed on Mar. 13, 2001, provisional application No. 60/275,020, filed on Mar. 13, 2001, provisional application No. 60/272,167, filed on Feb. 27, 2001, provisional application No. 60/272,122, filed on Feb. 27, 2001.

(51) Int. Cl.
*G06F 17/30* (2006.01)

(52) U.S. Cl. .......................................... 707/706; 707/769

(58) Field of Classification Search ............... 707/104.1, 707/8, 3, 1, 10, 706, 769, 999.001, 999.002, 707/999.008, 999.01, 999.104

See application file for complete search history.

(56) References Cited

U.S. PATENT DOCUMENTS

| 4,013,839 A | 3/1977 | Bell |
| 4,540,850 A | 9/1985 | Herr et al. |
| 4,600,814 A | 7/1986 | Cunniff et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |

(Continued)

FOREIGN PATENT DOCUMENTS

CA 2240878 12/1998

(Continued)

OTHER PUBLICATIONS

U.S. Appl. No. 09/828,679, filed Apr. 6, 2001, Craig Reding et al. cited by other.

(Continued)

*Primary Examiner* — Pierre M Vital
*Assistant Examiner* — Jorge A Casanova

(57) ABSTRACT

This invention provides methods and apparatus for context based querying to more efficiently provide directory services. In particular, methods and apparatus for querying a database to resolve contact information, e.g., a phone number, based on the context of the query are provided. By querying based on context, the query may be searched using a smaller field of search. Moreover, a context based query allows private phone numbers to be provided when the context of the query has been authenticated and approved for disclosure of the private phone number. Thus, when processing a query for a phone number, the present invention evaluates the context of the query in addition to the query itself to determine what results to provide to a user.

20 Claims, 19 Drawing Sheets

U.S. PATENT DOCUMENTS

| | | | |
|---|---|---|---|
| 5,274,700 A | 12/1993 | Gechter et al. | |
| 5,327,486 A | 7/1994 | Wolff et al. | 379/93.23 |
| 5,329,578 A | 7/1994 | Brennen et al. | |
| 5,428,663 A | 6/1995 | Grimes et al. | |
| 5,440,624 A | 8/1995 | Schoof | |
| 5,483,586 A | 1/1996 | Sussman | |
| 5,533,096 A | 7/1996 | Bales | |
| 5,535,265 A | 7/1996 | Suwandhaputra | |
| 5,550,907 A | 8/1996 | Carlsen | |
| 5,583,564 A | 12/1996 | Rao et al. | |
| 5,586,173 A | 12/1996 | Misholi et al. | |
| 5,588,037 A | 12/1996 | Fuller et al. | |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,652,789 A | 7/1997 | Miner et al. | |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,715,444 A | 2/1998 | Danish et al. | |
| 5,717,863 A | 2/1998 | Adamson et al. | |
| 5,719,925 A | 2/1998 | Peoples | |
| 5,724,412 A * | 3/1998 | Srinivasan | 379/93.23 |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A * | 8/1999 | Musk et al. | 701/201 |
| 5,945,989 A | 8/1999 | Freishtat et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,100,882 A | 8/2000 | Sharman et al. | |
| 6,122,348 A | 9/2000 | French-St. George et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 * | 2/2001 | Polnerow et al. | 707/10 |
| 6,654,768 B2 | 2/2001 | Celik | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,260,050 B1 | 7/2001 | Yost et al. | |
| 6,275,575 B1 | 8/2001 | Wu | |
| 6,282,522 B1 | 8/2001 | Davis et al. | |
| 6,298,062 B1 | 10/2001 | Gardell et al. | |
| 6,298,129 B1 | 10/2001 | Culver et al. | |
| 6,301,338 B1 | 10/2001 | Makela et al. | |
| 6,310,947 B1 | 10/2001 | Polcyn | 379/211.01 |
| 6,324,269 B1 | 11/2001 | Malik | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,371,484 B1 | 4/2002 | Yuan | |
| 6,373,930 B1 | 4/2002 | McConnell et al. | |
| 6,385,754 B1 | 5/2002 | Mizumoto et al. | |
| 6,389,113 B1 | 5/2002 | Silverman | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,301,609 B1 | 8/2002 | Aravamudan et al. | 709/207 |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 * | 8/2002 | Bowman-Amuah | 717/108 |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,590,603 B2 | 7/2003 | Sheldon et al. | |
| 6,590,969 B1 | 7/2003 | Peters et al. | |
| 6,594,352 B1 | 7/2003 | Smith | |
| 6,594,470 B1 | 7/2003 | Barnes et al. | |
| 6,600,736 B1 | 7/2003 | Ball et al. | |
| 6,609,113 B1 | 8/2003 | O'Leary et al. | |
| 6,611,590 B1 | 8/2003 | Lu et al. | |
| 6,614,786 B1 | 9/2003 | Byers | |
| 6,618,710 B1 | 9/2003 | Zondervan et al. | |
| 6,625,258 B1 | 9/2003 | Ram et al. | |
| 6,628,194 B1 | 9/2003 | Hellebust et al. | |
| 6,628,770 B1 | 9/2003 | Jain et al. | |
| 6,636,587 B1 | 10/2003 | Nagai et al. | |
| 6,643,356 B1 | 11/2003 | Hickey et al. | |
| 6,661,340 B1 | 12/2003 | Saylor et al. | |
| 6,665,388 B2 | 12/2003 | Bedingfield | |
| 6,668,046 B1 | 12/2003 | Albal | |
| 6,668,049 B1 | 12/2003 | Koch et al. | |
| 6,681,119 B1 | 1/2004 | Verdonk | |

| | | | | | |
|---|---|---|---|---|---|
| 6,683,939 B1 | 1/2004 | Chiloyan et al. | 7,418,090 B2 | 8/2008 | Reding et al. |
| 6,687,362 B1 | 2/2004 | Lindquist et al. | 7,428,580 B2 | 9/2008 | Hullfish et al. |
| 6,690,672 B1 | 2/2004 | Klein | 2001/0003202 A1 | 6/2001 | Mache et al. |
| 6,693,897 B1 | 2/2004 | Huang | 2001/0012286 A1 | 8/2001 | Huna et al. |
| 6,697,461 B1 | 2/2004 | Middleswarth et al. | 2001/0014863 A1 | 8/2001 | Williams, III |
| 6,697,796 B2 | 2/2004 | Kermani | 2001/0017777 A1 | 8/2001 | Maruyama et al. |
| 6,704,294 B1 | 3/2004 | Cruickshank | 2001/0025262 A1 | 9/2001 | Ahmed |
| 6,711,158 B1 | 3/2004 | Kahane et al. | 2001/0025280 A1 | 9/2001 | Mandato et al. |
| 6,717,938 B1 | 4/2004 | D'Angelo | 2001/0032181 A1 | 10/2001 | Jakstadt et al. |
| 6,718,026 B1 | 4/2004 | Pershan et al. | 2001/0039191 A1 | 11/2001 | Maierhofer |
| 6,724,887 B1 | 4/2004 | Eibacher et al. | 2001/0040954 A1 | 11/2001 | Brachman et al. |
| 6,731,238 B2 * | 5/2004 | Johnson ............... 342/357.09 | 2001/0043689 A1 | 11/2001 | Malik |
| 6,735,292 B1 | 5/2004 | Johnson | 2001/0043690 A1 | 11/2001 | Bakshi et al. |
| 6,738,458 B1 | 5/2004 | Cline et al. | 2001/0051534 A1 | 12/2001 | Amin |
| 6,747,970 B1 | 6/2004 | Lamb et al. | 2001/0054066 A1 | 12/2001 | Spitzer |
| 6,748,054 B1 | 6/2004 | Gross et al. | 2001/0056466 A1 | 12/2001 | Thompson et al. |
| 6,757,365 B1 | 6/2004 | Bogard | 2002/0012425 A1 | 1/2002 | Brisebois et al. |
| 6,768,788 B1 | 7/2004 | Langseth et al. | 2002/0018550 A1 | 2/2002 | Hafez |
| 6,768,790 B1 | 7/2004 | Manduley et al. | 2002/0022453 A1 | 2/2002 | Balog et al. |
| 6,771,949 B1 | 8/2004 | Corliss | 2002/0026575 A1 | 2/2002 | Wheeler et al. |
| 6,775,546 B1 | 8/2004 | Fuller | 2002/0035617 A1 | 3/2002 | Lynch et al. |
| 6,788,772 B2 | 9/2004 | Barak et al. | 2002/0040355 A1 | 4/2002 | Weiner |
| 6,788,775 B1 | 9/2004 | Simpson | 2002/0046299 A1 | 4/2002 | Lefeber et al. |
| 6,792,092 B1 | 9/2004 | Michalewicz | 2002/0055351 A1 | 5/2002 | Elsey et al. |
| 6,798,753 B1 | 9/2004 | Doganata et al. | 2002/0057678 A1 | 5/2002 | Jiang et al. |
| 6,801,610 B1 | 10/2004 | Malik | 2002/0069060 A1 | 6/2002 | Cannavo et al. |
| 6,807,258 B1 | 10/2004 | Malik | 2002/0069096 A1 | 6/2002 | Lindoerfer et al. |
| 6,807,259 B1 | 10/2004 | Patel et al. | 2002/0071539 A1 | 6/2002 | Diament et al. |
| 6,816,468 B1 | 11/2004 | Czuickshank | 2002/0073163 A1 | 6/2002 | Churchill et al. |
| 6,816,469 B1 | 11/2004 | Kung et al. | 2002/0075303 A1 | 6/2002 | Thompson et al. |
| 6,820,055 B2 | 11/2004 | Saindon et al. | 2002/0075306 A1 | 6/2002 | Thompson et al. |
| 6,842,460 B1 | 1/2005 | Olkkonen et al. | 2002/0076026 A1 | 6/2002 | Batten |
| 6,847,823 B2 | 1/2005 | Lehikoinen et al. | 2002/0076027 A1 | 6/2002 | Bernnan et al. |
| 6,853,634 B1 | 2/2005 | Davies et al. | 2002/0077082 A1 | 6/2002 | Cruickshank |
| 6,853,713 B1 | 2/2005 | Fobert et al. | 2002/0078153 A1 | 6/2002 | Chung et al. |
| 6,856,974 B1 | 2/2005 | Ganesan et al. | 2002/0080942 A1 | 6/2002 | Clapper ................ 379/201.01 |
| 6,876,736 B2 | 4/2005 | Lamy et al. | 2002/0082028 A1 | 6/2002 | Wittenkamp |
| 6,882,714 B2 | 4/2005 | Mansfield | 2002/0082030 A1 | 6/2002 | Berndt et al. |
| 6,882,838 B1 | 4/2005 | Lee et al. | 2002/0083462 A1 | 6/2002 | Arnott ....................... 348/14.08 |
| 6,885,742 B1 | 4/2005 | Smith | 2002/0085515 A1 | 7/2002 | Jaynes et al. |
| 6,907,111 B1 | 6/2005 | Zhang et al. | 2002/0085687 A1 | 7/2002 | Contractor et al. |
| 6,917,610 B1 | 7/2005 | Kung et al. | 2002/0085701 A1 | 7/2002 | Parsons et al. |
| 6,944,279 B2 | 9/2005 | Elsey et al. | 2002/0100798 A1 | 8/2002 | Farrugia et al. |
| 6,947,538 B2 | 9/2005 | Shen et al. | 2002/0103864 A1 | 8/2002 | Rodman et al. |
| 6,954,521 B2 | 10/2005 | Bull et al. | 2002/0103898 A1 | 8/2002 | Moyer et al. |
| 6,956,942 B2 | 10/2005 | McKinzie et al. | 2002/0110121 A1 | 8/2002 | Mishra ......................... 370/389 |
| 6,958,984 B2 | 10/2005 | Kotzin | 2002/0115471 A1 | 8/2002 | DeLoye et al. |
| 6,961,409 B2 | 11/2005 | Kato | 2002/0137507 A1 | 9/2002 | Winkler |
| 6,963,857 B1 | 11/2005 | Johnson | 2002/0137530 A1 | 9/2002 | Karve |
| 6,970,705 B2 | 11/2005 | Yoshimoto et al. | 2002/0138468 A1 | 9/2002 | Kermani |
| 6,996,227 B2 | 2/2006 | Albal et al. | 2002/0146105 A1 | 10/2002 | McIntyre |
| 6,996,370 B2 | 2/2006 | DeLoye et al. | 2002/0147777 A1 | 10/2002 | Hackbarth et al. |
| 6,999,563 B1 | 2/2006 | Thorpe et al. | 2002/0147811 A1 | 10/2002 | Schwartz et al. ............. 709/225 |
| 7,024,209 B1 | 4/2006 | Gress et al. | 2002/0152165 A1 | 10/2002 | Dutta et al. |
| 7,027,435 B2 | 4/2006 | Bardehle | 2002/0168055 A1 | 11/2002 | Crockett et al. |
| 7,031,437 B1 | 4/2006 | Parsons et al. | 2002/0177410 A1 | 11/2002 | Klein et al. |
| 7,043,521 B2 | 5/2006 | Eitel | 2002/0178117 A1 | 11/2002 | Maguire et al. |
| 7,065,198 B2 | 6/2006 | Brown et al. | 2003/0014488 A1 | 1/2003 | Dalal et al. |
| 7,068,768 B2 | 6/2006 | Barnes | 2003/0035381 A1 | 2/2003 | Chen et al. |
| 7,076,528 B2 | 7/2006 | Premutico | 2003/0036380 A1 | 2/2003 | Skidmore |
| 7,107,312 B2 | 9/2006 | Hackbarth et al. | 2003/0045309 A1 | 3/2003 | Knotts |
| 7,116,972 B1 | 10/2006 | Zhang et al. | 2003/0046071 A1 | 3/2003 | Wyman et al. |
| 7,130,390 B2 | 10/2006 | Abburi | 2003/0053612 A1 | 3/2003 | Henrikson et al. |
| 7,139,728 B2 | 11/2006 | Rigole | 2003/0055735 A1 | 3/2003 | Cameron et al. |
| 7,139,782 B2 | 11/2006 | Osaki | 2003/0055906 A1 | 3/2003 | Packham et al. |
| 7,142,646 B2 | 11/2006 | Zafar et al. | 2003/0058838 A1 | 3/2003 | Wengrovitz ................ 370/352 |
| 7,149,773 B2 | 12/2006 | Haller et al. | 2003/0069874 A1 | 4/2003 | Hertzog et al. |
| 7,174,306 B1 | 2/2007 | Haseltine | 2003/0083040 A1 | 5/2003 | Ruth et al. |
| 7,181,417 B1 | 2/2007 | Langseth et al. | 2003/0092451 A1 | 5/2003 | Holloway et al. |
| 7,187,932 B1 | 3/2007 | Barchi | 2003/0093700 A1 | 5/2003 | Yoshimoto et al. |
| 7,190,773 B1 | 3/2007 | D'Silva et al. | 2003/0096626 A1 | 5/2003 | Sabo et al. |
| 7,209,955 B1 | 4/2007 | Major et al. | 2003/0097635 A1 | 5/2003 | Giannetti |
| 7,212,808 B2 | 5/2007 | Engstrom et al. | 2003/0104827 A1 | 6/2003 | Moran et al. |
| 7,245,929 B2 | 7/2007 | Henderson et al. | 2003/0108172 A1 | 6/2003 | Petty et al. |
| 7,254,220 B1 | 8/2007 | Reding et al. | 2003/0112928 A1 | 6/2003 | Brown et al. |
| 7,283,808 B2 | 10/2007 | Castell et al. | 2003/0119532 A1 | 6/2003 | Hatch |
| 7,308,087 B2 | 12/2007 | Joyce et al. | 2003/0140004 A1 | 7/2003 | O'Leary et al. |
| 7,315,614 B2 | 1/2008 | Bedingfield, Sr. et al. | 2003/0142798 A1 | 7/2003 | Gavette et al. |
| 7,379,538 B1 | 5/2008 | Ali et al. | 2003/0147518 A1 | 8/2003 | Albal et al. |

| | | | | | |
|---|---|---|---|---|---|
| 2003/0149662 A1 | 8/2003 | Shore | JP | 11-187156 | 7/1999 |
| 2003/0158860 A1 | 8/2003 | Caughey | JP | 11-191800 | 7/1999 |
| 2003/0165223 A1 | 9/2003 | Timmins et al. | JP | 11-266309 | 9/1999 |
| 2003/0167229 A1 | 9/2003 | Ludwig et al. | JP | 2000-032116 | 1/2000 |
| 2003/0169330 A1 | 9/2003 | Ben-Shachar et al. | JP | 2000-134309 | 5/2000 |
| 2003/0179743 A1 | 9/2003 | Bosik et al. | JP | 2000-165433 | 6/2000 |
| 2003/0179864 A1 | 9/2003 | Stillman et al. | JP | 2000-196756 | 7/2000 |
| 2003/0187992 A1 | 10/2003 | Steenfeldt et al. | JP | 2000224301 | 8/2000 |
| 2003/0208541 A1 | 11/2003 | Musa | JP | 2000-270307 | 9/2000 |
| 2003/0217097 A1 | 11/2003 | Eitel | JP | 2001-144859 | 5/2001 |
| 2003/0228863 A1 | 12/2003 | Vander Veen et al. | JP | 2001-156921 | 6/2001 |
| 2004/0002350 A1 | 1/2004 | Gopinath et al. | JP | 2001-197210 | 7/2001 |
| 2004/0019638 A1 | 1/2004 | Makagon et al. ............ 709/204 | JP | 2001-197562 | 7/2001 |
| 2004/0034700 A1 | 2/2004 | Polcyn | JP | 2001-298545 | 10/2001 |
| 2004/0044658 A1* | 3/2004 | Crabtree et al. ................. 707/3 | JP | 2002-016673 | 1/2002 |
| 2004/0052356 A1 | 3/2004 | McKinzie et al. | JP | 2002-044257 | 2/2002 |
| 2004/0081292 A1 | 4/2004 | Brown et al. | JP | 2002-057807 | 2/2002 |
| 2004/0103152 A1 | 5/2004 | Ludwig et al. | JP | 2002-232575 | 8/2002 |
| 2004/0119814 A1 | 6/2004 | Clisham et al. | JP | 2002-237893 | 8/2002 |
| 2004/0127256 A1 | 7/2004 | Goldthwaite et al. | JP | 2002-247148 | 8/2002 |
| 2004/0156491 A1 | 8/2004 | Reding et al. | JP | 2002-261834 | 9/2002 |
| 2004/0184593 A1 | 9/2004 | Elsey et al. | JP | 2002-300290 | 10/2002 |
| 2004/0203942 A1 | 10/2004 | Dehlin | JP | 2002-300306 | 10/2002 |
| 2004/0208305 A1 | 10/2004 | Gross et al. | WO | 96/14704 | 5/1996 |
| 2004/0236792 A1 | 11/2004 | Celik | WO | 99/38309 | 7/1999 |
| 2004/0247088 A1 | 12/2004 | Lee | WO | 00/45557 | 8/2000 |
| 2004/0249884 A1 | 12/2004 | Caspi et al. | WO | 0064133 | 10/2000 |
| 2004/0264654 A1 | 12/2004 | Reding et al. | WO | WO01/11586 | 2/2001 |
| 2005/0053221 A1 | 3/2005 | Reding et al. | WO | WO 01/35621 | 5/2001 |
| 2005/0102382 A1 | 5/2005 | MacGregor et al. | WO | 0152513 | 7/2001 |
| 2005/0129208 A1 | 6/2005 | McGrath et al. | WO | WO 01/89212 | 11/2001 |
| 2005/0149487 A1 | 7/2005 | Celik | | | |
| 2005/0191994 A1 | 9/2005 | May et al. | | | |
| 2005/0216421 A1 | 9/2005 | Barry et al. | | | |
| 2005/0220286 A1 | 10/2005 | Valdez et al. | | | |
| 2005/0243993 A1 | 11/2005 | McKinzie et al. | | | |
| 2006/0093120 A1 | 5/2006 | Thorpe et al. | | | |
| 2006/0095575 A1 | 5/2006 | Sureka et al. | | | |
| 2006/0168140 A1 | 7/2006 | Inoue et al. | | | |
| 2006/0276179 A1 | 12/2006 | Ghaffari et al. | | | |
| 2006/0277213 A1 | 12/2006 | Robertson et al. | | | |
| 2007/0021111 A1 | 1/2007 | Celik | | | |

FOREIGN PATENT DOCUMENTS

| | | |
|---|---|---|
| DE | 10110942 | 9/2002 |
| EP | 0818908 | 1/1998 |
| EP | 1028578 | 8/2000 |
| EP | 1161063 | 12/2001 |
| EP | 1193617 | 3/2002 |
| EP | 1235387 | 8/2002 |
| JP | 59169264 | 9/1984 |
| JP | 02-260750 | 10/1990 |
| JP | 04-336742 | 11/1992 |
| JP | 05-316233 | 11/1993 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 1/1996 |
| JP | 08-181763 | 7/1996 |
| JP | 08-298546 | 11/1996 |
| JP | 08-331642 | 12/1996 |
| JP | 08331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |

OTHER PUBLICATIONS eVoice, Voice-ASP White Paper, Voicemail—Technology & Processes, Dec. 13, 2000, pp. 1-7.
eVoice, "Voice-ASP, White Paper: Market Opportunities for Enhanced Voicemail", Nov. 10, 2000.
"The Mobile Phone User Guide", http://www.mobileshop.org/usertech/wildfire.htm, printed Oct. 1, 2004.
Kornowski, J., "Wildfire at Your Back and Call-A Voice-Activated Telephone Assistant That Minds You and Your Messages", http://www.lacba.org/lalawyer/techwildfire.html, printed Oct. 1, 2004.
Cisco Personal Assistant 1.4, Cisco Systems, Jun. 24, 2003, http://www.cisco.com/en/US/products/sw/voicesw/ps2026/prod_presentation_list.html, printed Oct. 1, 2004.
U.S. Appl. No. 09/828,679, filed Apr. 6, 2001, Reding et al.
U.S. Appl. No. 09/785,223, filed Feb. 16, 2001, Swingle et al.
"MP3 Recorder Download—MP3 Recorder—Record Audio Stream to MP3 or WAV," 2002 http://www.mp3-recorder.net.
"FAQ Premium Home Answer" eVoice, http://content.evoice.com/wcs/signUp/FAQ_premHA_s01.htm, date: unknown.
"Voice-ASP, White Paper Technology & Processes," eVoice, Dec. 13, 2000.
"Voice-ASP, White Paper: Market Opportunities for Enhanced Voicemail," eVoice, Nov. 10, 2000.
"Audio Digitizing Process," TalkBank, http://www.talkbank.org/da/audiodig.html, date: unknown.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center—Working with Other Programs, What is Shockwave Audio Streaming?" http://www.macromedia.com/support/soundedit/how/shock/whatis.html, date: unknown.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable, date: unknown.
"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/edition5/synch_collab.asp, date: unknown.

"NetMeeting101," http://www.meetingbywire.com/NetMeeting101.htm, date: unknown.

"NetMeeting102," http://www.meetingbywire.com/NetMeeting102.htm, date: unknown.

"Instructions on Application Sharing and Data Collaboration," VCON Escort and Cruiser, http://www.vide.gatech.edu/docs/share/, date: unknown.

"Instructions on Multipoint Application Sharing and Data Collaboration," VCON Escort and Cruiser with the RadVision MCU, http://www.vide.gatech.edu/docs/multi-share/, date: unknown.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

Business Solutions/Professional, http://www.accessline.com/business_sol/bs_professional_body.html, date: unknown.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging", M. Day, et al. Fujitsu, Feb. 2000, Network Working Group, Request for Comments 2778.

Data Connection Ltd., "SmartDialer, Functional Overview, v1 0," dated Nov. 3, 2003.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

* cited by examiner

FIG.3c

| User ID 502 | Current Location 504 | Recent Incoming Calls 506 | Recent Outgoing Calls 508 | Recent Query Results 510 |
|---|---|---|---|---|
| | | | | |

METHOD AND APPARATUS FOR CONTEXT BASED QUERYING

RELATED APPLICATIONS

This is a continuation of prior U.S. patent application Ser. No. 10/084,390, filed Feb. 27, 2002, now U.S. Pat. No. 6,976,017, titled "METHOD AND APPARATUS FOR CONTEXT BASED QUERYING." Applicant claims the right to priority under 35 U.S.C. § 119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. patent application Ser. No. 10/083,792 entitled "VOICE MAIL INTEGRATION WITH INSTANT MESSENGER," filed Feb. 27, 2002; U.S. patent application Ser. No. 10/083,884, entitled "DEVICE INDEPENDENT CALLER ID," filed Feb. 27, 2002; U.S. patent application Ser. No. 10/083,822, entitled "METHOD AND APPARATUS FOR A UNIFIED COMMUNICATION MANAGEMENT VIA INSTANT MESSAGING," filed Feb. 27, 2002; U.S. patent application Ser. No. 10/083,793, entitled "METHOD AND APPARATUS FOR CALENDARED COMMUNICATIONS FLOW CONTROL," filed Feb. 27, 2002; U.S. patent application Ser. No. 10/084,121, entitled "CALENDAR-BASED CALLING AGENTS," filed Feb. 27, 2002; U.S. patent application Ser. No. 10/083,798, entitled "METHOD AND APPARATUS FOR INTEGRATED BILLING VIA PDA," filed Feb. 27, 2002; and U.S. patent application Ser. No. 10/084,002, entitled "METHOD AND APPARATUS FOR DIAL STREAM ANALYSIS," filed Feb. 27, 2002, and all of which are expressly incorporated herein by reference in their entirety.

DESCRIPTION OF THE INVENTION

1. Field of the Invention

The present invention relates generally to context based querying and, more particularity, to methods and apparatus for querying a database to determine desired contact information, e.g., a phone number, based on the context of the query.

2. Background of the Invention

Many users and businesses rely upon directory services to determine contact information such as phone numbers. For example, a user may call a directory services number, e.g., "411", to determine a phone number of a particular person or business. For example, the user may provide a name of a person or entity, city, and state for that person or entity to obtain the desired phone number.

Unfortunately, using such search inputs based on name, city, and state requires a large field of search in order to determine the desired phone number. In addition, when using such a large field of search, numerous matches for the query may result. This can be problematic if multiple phone numbers are provided having the same name, which makes it difficult to determine the phone number to use.

Moreover, some phone numbers are kept private and are not available for searching. Thus, in these instances, a user may not be able to search private phone numbers using a directory service.

SUMMARY OF THE INVENTION

In accordance with the principles of the present invention, a method for context-based retrieval is provided. The method comprises: storing information associated with subscribers and usable to determine contexts associated with an information request; storing contact information; receiving from a requester the information request including identifying information associated with the requester; comparing the requester identifying information to determine whether the requester is one of the subscribers for which information has been stored; determining a context for the request when it is determined that the requester is one of the subscribers for which information has been stored; and providing the requester with a response to the information request selected from the stored contact information based on a condition associated with the determined context for the request.

In accordance with another embodiment consistent with the principles of the present invention a method for performing a context based query to find information in a directory for a destination is provided. The method comprises: receiving information identifying a user; receiving a query request for to find information for the destination from the user; determining a context for the query request; obtaining information in the directory related to the destination based on the context of the query request; and providing the obtained information regarding the destination to the user.

In accordance with another embodiment consistent with the principles of the present invention, an apparatus for context-based retrieval comprises: a first storage system for storing information associated with subscribers and usable to determine contexts associated with an information request; a second storage system for storing contact information; a receiver for receiving from a requester the information request including identifying information associated with the requester; a processor for comparing the requester identifying information to determine whether the requester is one of the subscribers for which information has been stored and to determine a context for the request when it is determined that the requester is one of the subscribers for which information has been stored; and a transmitter for providing the requester with a response to the information request selected from the stored contact information, based on a condition associated with the determined context for the request.

In accordance with another embodiment consistent with the principles of the present invention, a system for context-based retrieval comprises: means for storing information associated with subscribers and usable to determine contexts associated with an information request; means for storing contact information; means for receiving from a requester the information request including identifying information associated with the requester; means for comparing the requester identifying information to determine whether the requester is one of the subscribers for which information has been stored; means for determining a context for the request when it is determined that the requester is one of the subscribers for which information has been stored; and means for providing the requester with a response to the information request selected from the stored contact information, based on a condition associated with the determined context for the request.

In accordance with another embodiment consistent with the principles of the present invention, a computer readable medium capable of configuring a device to perform a method for context-based retrieval is provided. The method comprises: storing information associated with subscribers and usable to determine contexts associated with an information request; storing contact information; receiving from a requester the information request including identifying information associated with the requester; comparing the requester identifying information to determine whether the requester is one of the subscribers for which information has been stored; determining a context for the request when it is determined that the requester is one of the subscribers for which information has been stored; and providing the requester with a response to the information request selected from the stored contact information, based on a condition associated with the determined context for the request.

It is to be understood that both the foregoing general description and the following detailed description are exemplary and explanatory only and are not restrictive of the invention, as claimed.

BRIEF DESCRIPTION OF THE DRAWINGS

FIGS. 3a-3m are exemplary screen shots in accordance with methods and apparatus consistent with the principles of the present invention;

FIG. 5 is an exemplary record table used for a context based query, in accordance with methods and apparatus consistent with the principles of the present invention;

DETAILED DESCRIPTION

In accordance with the principles of the present invention, methods and apparatus for querying a database to determine desired contact information, e.g., a phone number, based on the context of the query are provided. By using the context of the query, a directory system can look at patterns of user action and requests and pre-provided user information. Also, by using context-based querying, the field of search for the query may be reduced significantly and, thus, allow users to obtain desired information more quickly and efficiently. Moreover, based on user registration, private phone numbers can be quickly provided when the user has been authenticated and approved for disclosure of private phone numbers. In particular, when processing a query for a phone number, methods and apparatus consistent with the present invention evaluate the context of the query in addition to the query itself to obtain results for to the user.

Reference will now be made in detail to exemplary embodiments of the present invention, examples of which are illustrated in the accompanying drawings. Wherever possible, the same reference numbers will be used throughout the drawings to refer to the same or like parts.

Figure 1:
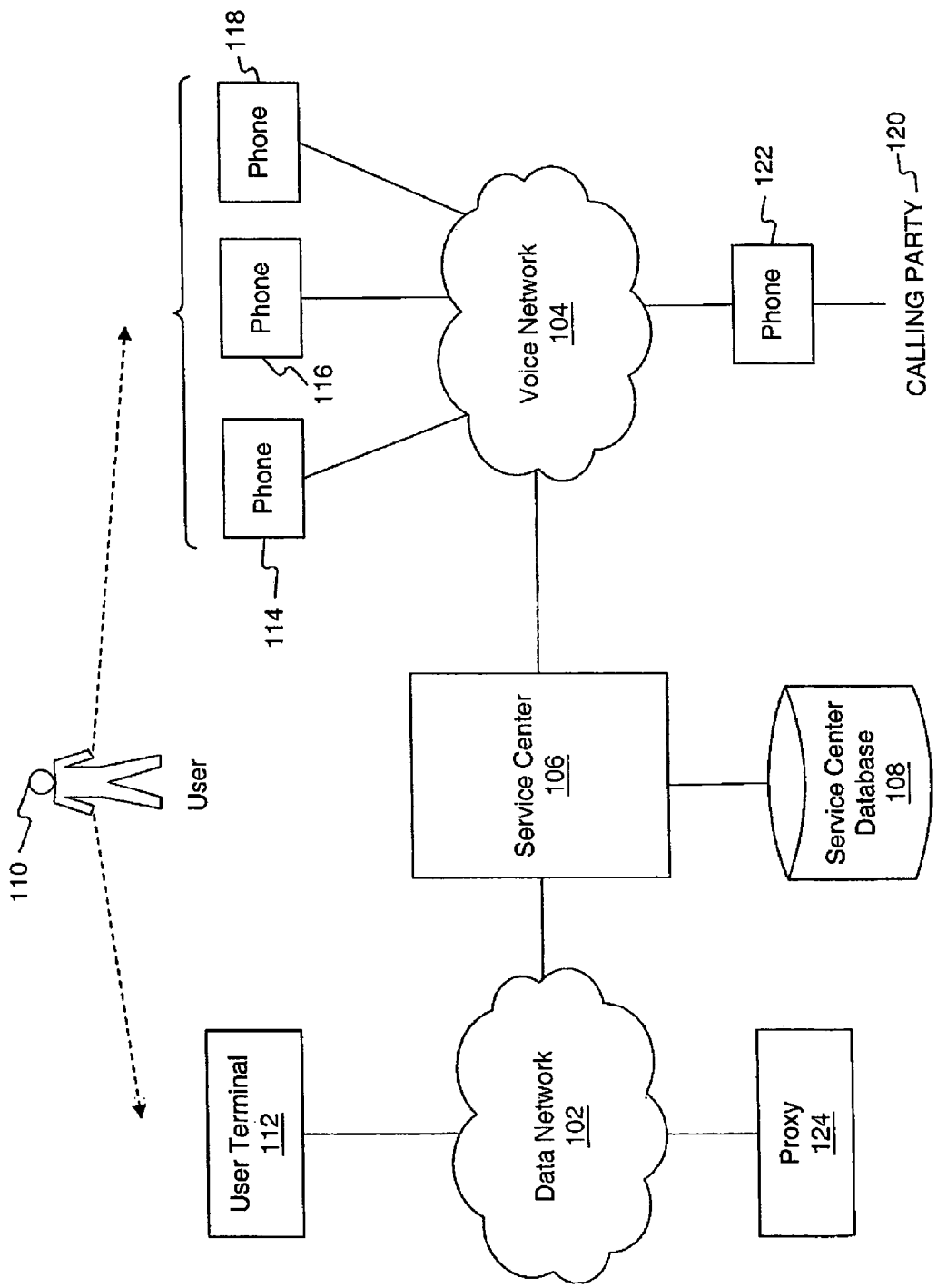
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a data terminal 112 to interface data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 1, such as data terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including, an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications are forwarded, such as telephone calls over voice network 104. Additionally, service center database 108 may include a user profile database, a directory database, or a link to a directory service database. Service center database 108 may be implemented as an Oracle™ database using a combination of known hardware and software, such as Proliant™ servers and EMC storage devices.

Data terminal 112 provides user 110 an interface to data network 102. For example, data terminal 112 may be implemented using any device capable of accessing the Internet, such as a general purpose computer or personal computer equipped with a modem. Data terminal 112 may also be implemented in other devices, such as the Blackberry™, and Ergo Audrey™. Furthermore, data terminal 112 may be implemented in wireless devices, such as pagers, mobile phones (with data access functions), and Personal Digital Assistants ("PDA") with network connections.

Data terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. Although there is no accepted universal IM standard, an appropriate IM model may be found in RFC 2778, M. Day et al., The Internet Society (2000), titled "A Model for Presence and Instant Messaging," which describes a model for providing instant messaging services. There are several known IM systems including America OnLine Instant Messenger ("AIM") and Microsoft Network Messenger Service ("MSNMS"). In addition to IM services, data terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Data terminal 112 may communicate directly with service center 106. For example, a client application may be installed on data terminal 112, which directly communicates with service center 106. Alternatively, data terminal 112 may communicate with service center 106 via proxy 124. Data terminal 112 is described in further detail with reference to FIG. 2.

Proxy 124 provides an intermediate communications service for data terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL"). Proxy 124 may then establish an SSL session with service 106 and provide the information from user 110.

Phones 114, 116, 118, and 122 interface voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
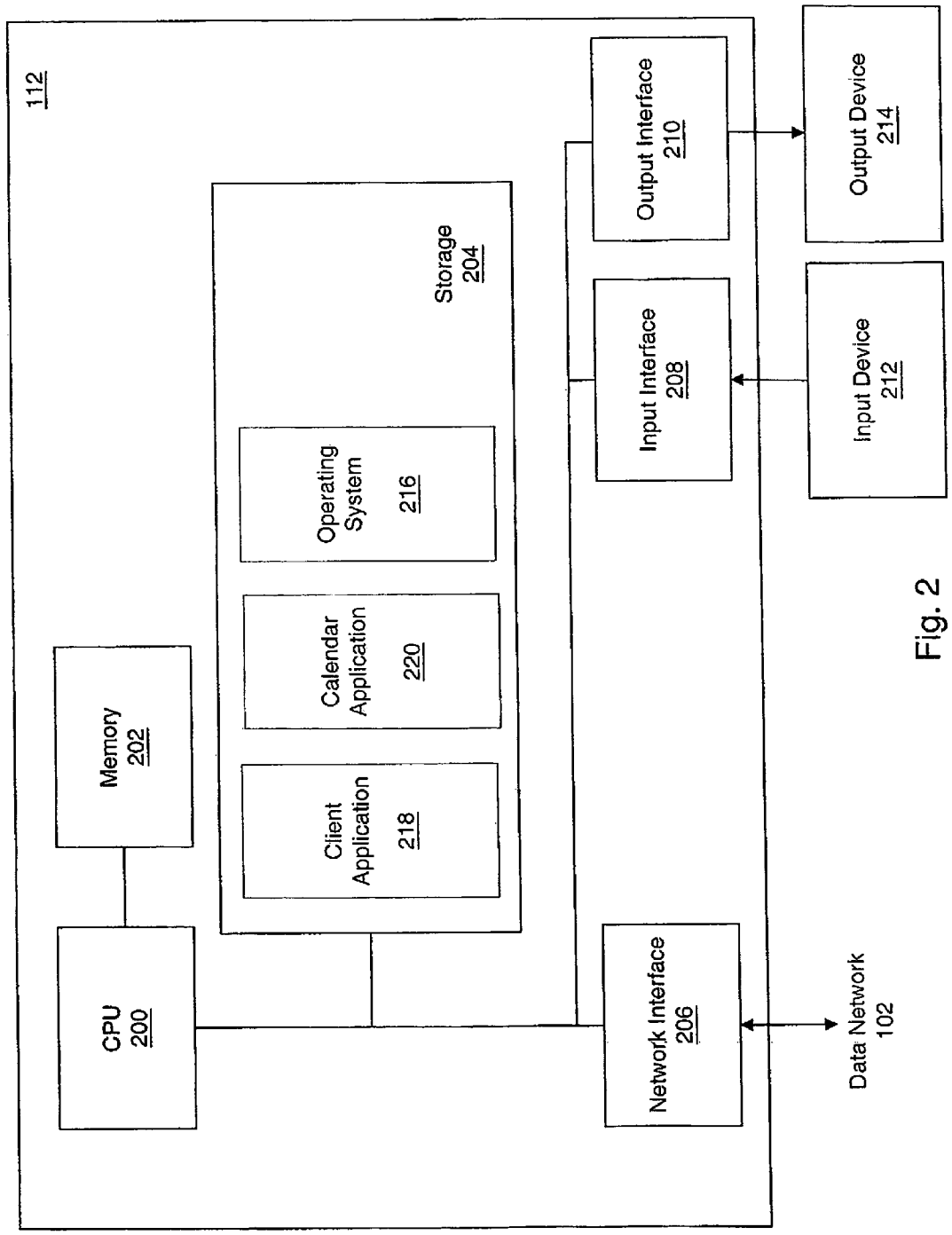
FIG. 2 is a block diagram of a data terminal, in accordance with methods and apparatus consistent with the principles of the present invention.

FIG. 2 is a block diagram of a data terminal, in accordance with methods and apparatus consistent with the principles of the present invention. As shown, data terminal 112 includes a central processing unit (CPU) 200, a memory 202, a storage module 204, a network interface 206, an input interface 208, an output interface 210, an input device 212, and an output device 214.

CPU 200 provides control and processing functions for data terminal 112. Although FIG. 2 illustrates a single CPU, data terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when data terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 provides mass storage for data terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within data terminal 112, storage module 204 may be implemented external to data terminal 112.

Storage module 204 includes program code and information for data terminal 112 to communicate with service center 106. Storage module 204 includes program code for a calendar application 220, such as Group Wise provided by Novell Corporation, or Outlook provided by Microsoft Corporation; a client application 218, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on data terminal 112.

Network interface 206 provides a communications interface between data terminal 112 and data network 102. Network interface 206 may receive and transmit communications for data terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3A:
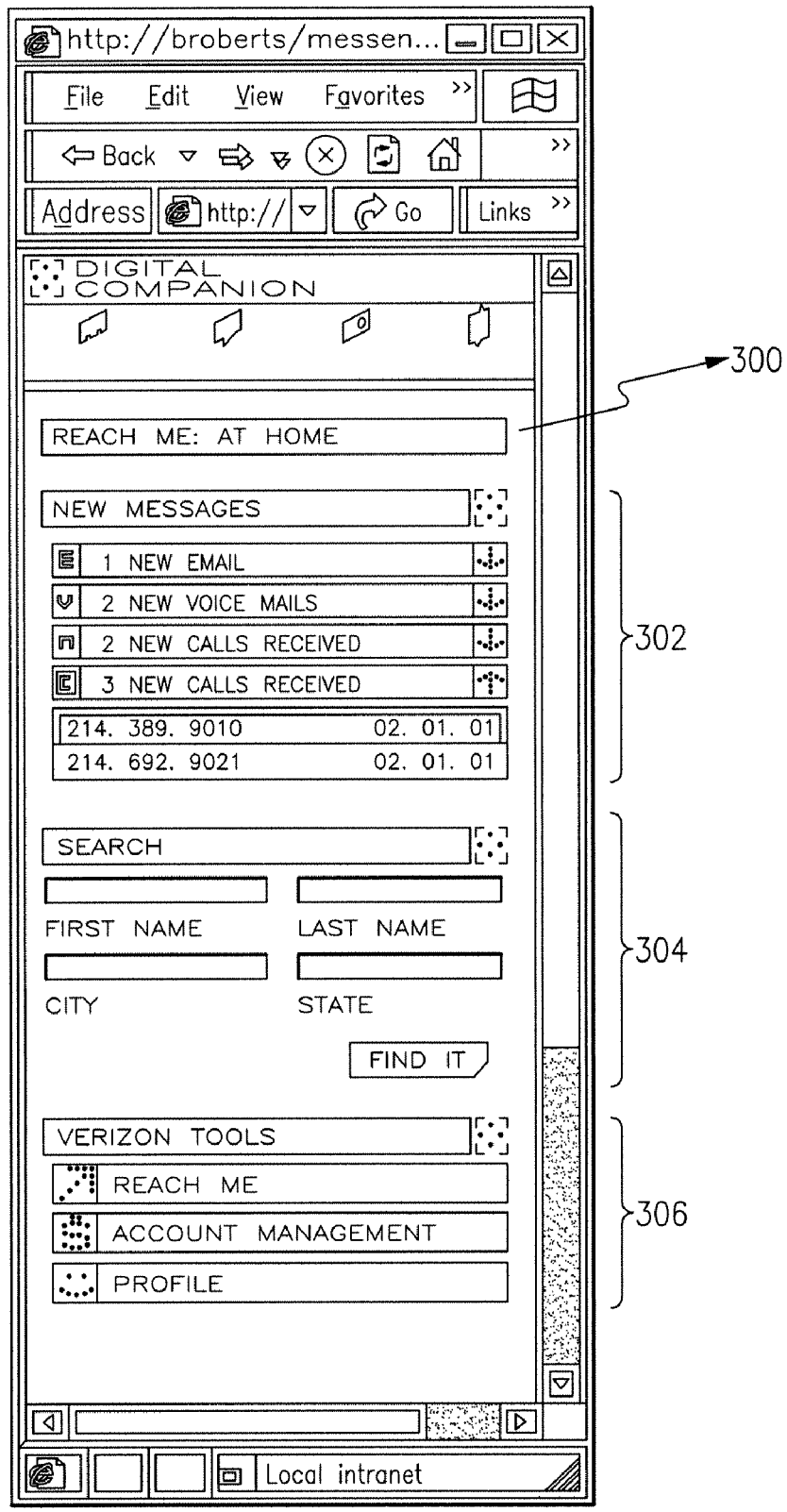

FIGS. 3a-3m illustrate exemplary screen shots of user interfaces to implement voice main integration with instant messenger. As shown in FIG. 3a, the screen shot provides a current location portion 300 for indicating that communications should be directed to the "AT HOME" location. Current location 300 may also indicate other locations, such as, for example, "AT WORK, "IN CAR", and "ON TRAVEL." Such locations can be based on predetermined choices or user configurable choices. The screen shot also provides a new message portion 302 that lists the number and type of new messages. In particular, new message portion 302 shows that there is "1 New EMAIL", "2 NEW VOICE MAILS", "2 NEW NOTIFICATIONS", and "3 NEW CALLS RECEIVED". New message portion 302 can also provide the last phone numbers dialed and the date they were dialed.

The screen shot also provides a search portion 304 that allows a user to search for contact information regarding a particular person. For example, search portion 304 provides "FIRST NAME", "LAST NAME", "CITY", and "STATE" search inputs to find contact information of a particular person. The screen shot also provides a tools portion 306 that gives a user options to modify various aspects of the communications service. These options may include "REACH ME", "ACCOUNT MANAGEMENT", and "PROFILE" options. The "REACH ME" option allows a user to change where a user is to be contacted shown in the current location portion 300. The "ACCOUNT MANAGEMENT" option allows a user to modify information such as billing information associated with a called party. The "PROFILE" option allows a user to modify how communications are forwarded.

Figure 3B:
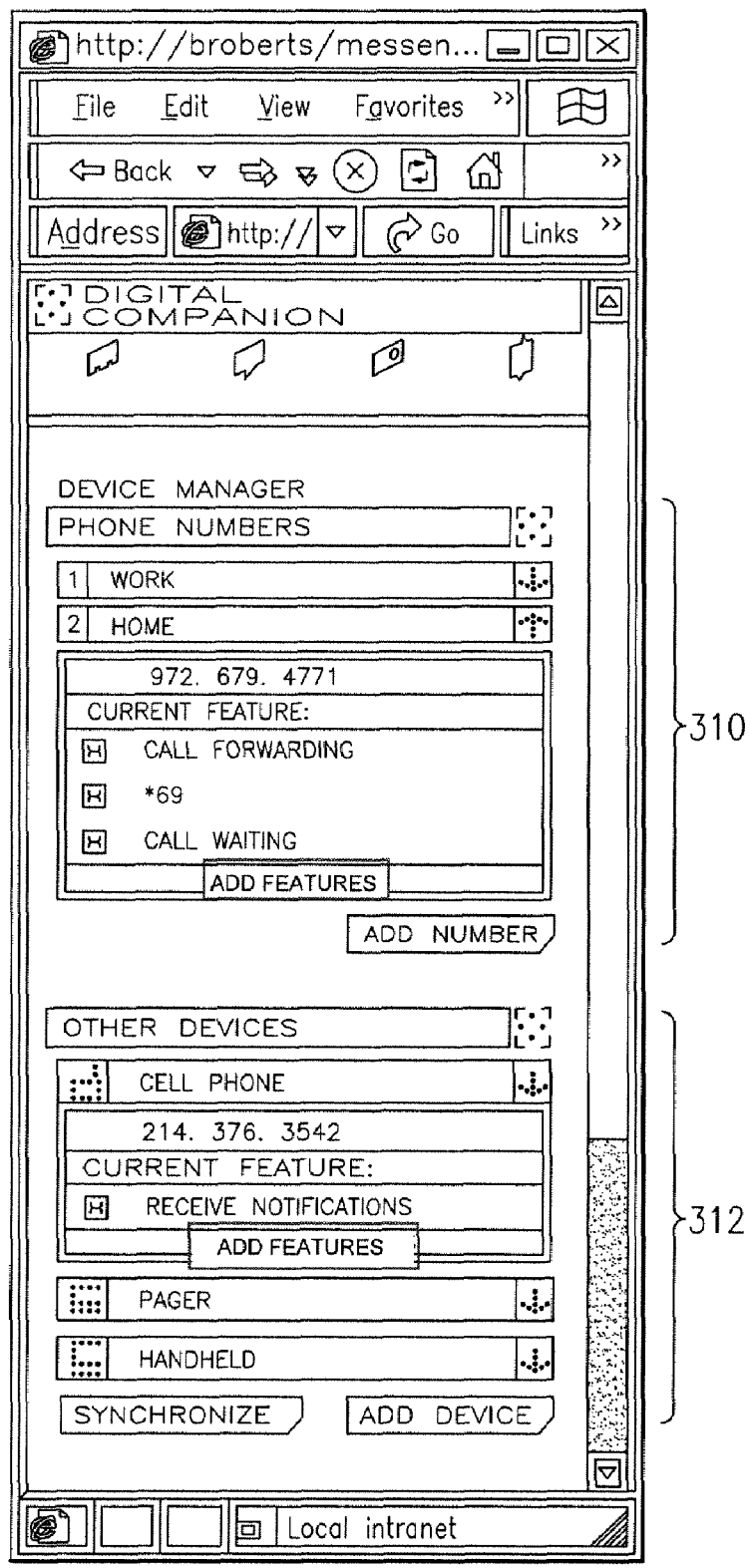

As shown in FIG. 3b, the screen shot shows a user interface for a device manager. The screen shot shows a device manager portion 310 that allows a user to view and to change phone number settings. For example, the user can change at "WORK" and "AT HOME" phone number settings. Device manage portion 310 also provides a "CURRENT FEATURES" option that lists features being used. Such features include "CALL FORWARDING", "69", and "CALL WAITING". The user also has the option to "ADD FEATURES" or "ADD NUMBERS". The screen shot also provides a other devices portion 312 that allows a user to manage devices which are not associated with a particular location. Other devices portion 310 lists "CELL PHONE", "PAGER", and "HANDHELD" devices as other devices in which a user can manage. For each device, a user can view the number for the other device and associated "CURRENT FEATURES" for the other device. Other devices portion 310 also provides a "SYNCHRONIZE" option and "ADD DEVICE" option for the user.

Figure 3C:
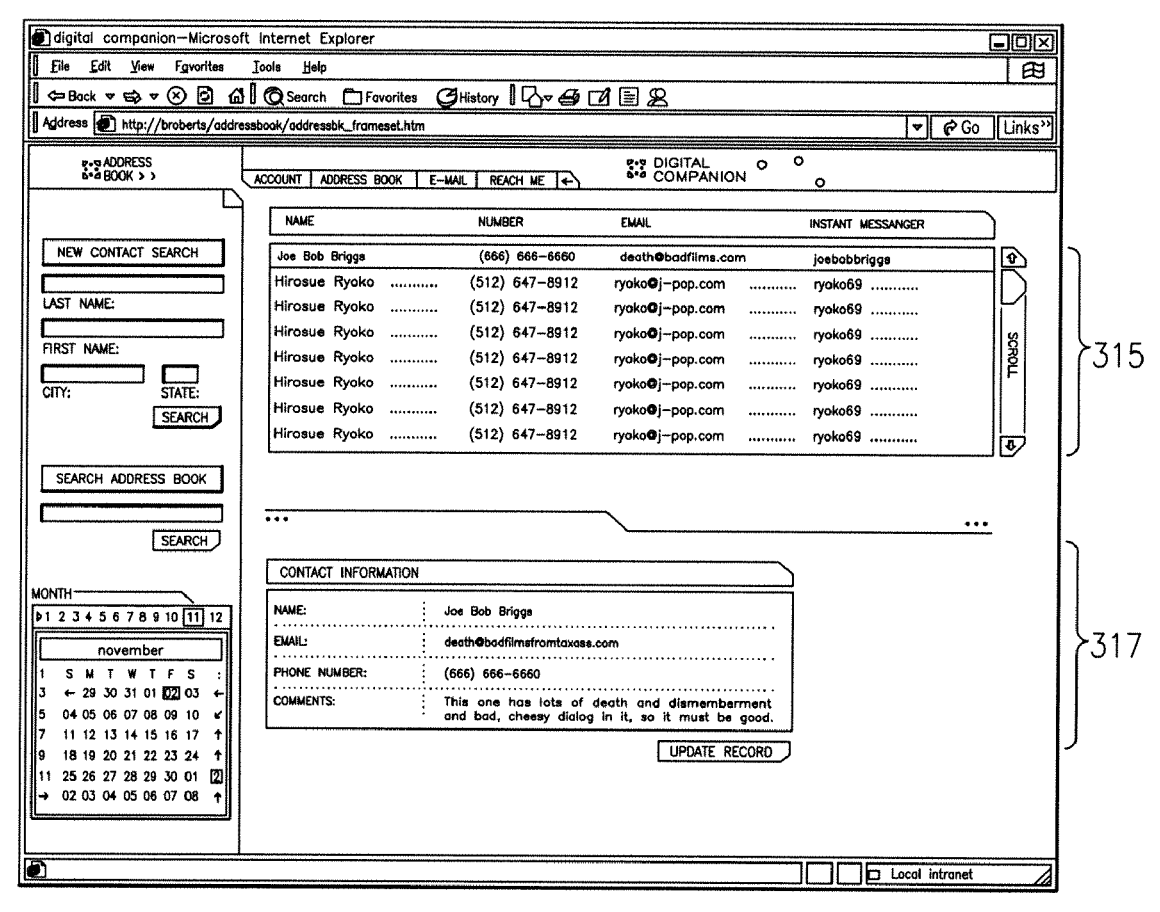

As shown in FIG. 3c, the screen shot shows a user interface for an address book. The screen shot shows an address list portion 315 that lists contact information for the user. For example, the contact information may include "NAME", "ADDRESS", "EMAIL", and "INSTANT MESSENGER" information. The screen shot also shows a record information portion 317 that displays a specific record for a contact. The user has the option to "UPDATE" the record. The screen shows also provides a search window to search for contact information and a calendar.

Figure 3D:
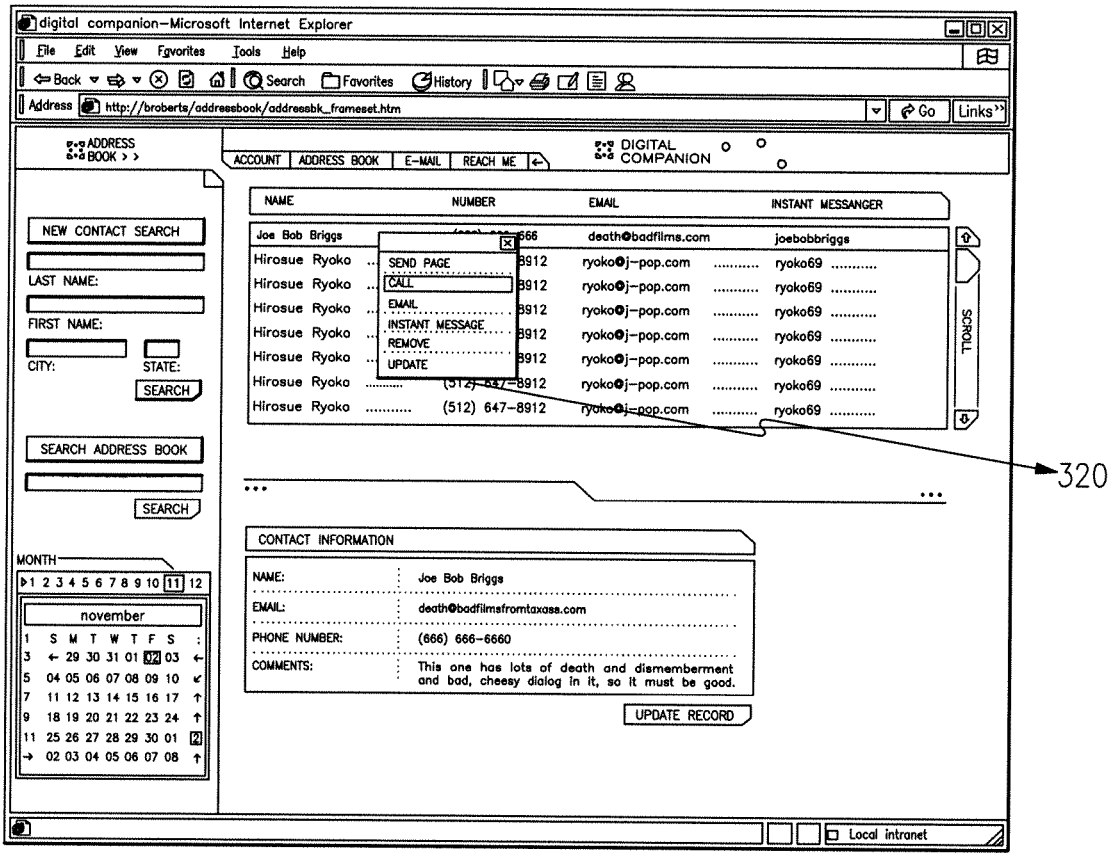

As shown in FIG. 3d, the screen shot shows the user interface of FIG. 3c with a pull-down menu 320 that provides a number of options for a user to contact a selected person consistent with the present invention. For example, the user can contact the selected person using such options as "SEND PAGE", "CALL", "EMAIL", and "INSTANT MESSAGE". Pull-down menu 320 also provides a "REMOVE" and "UPDATE" option to modify contact information in the address book.

Figure 3E:
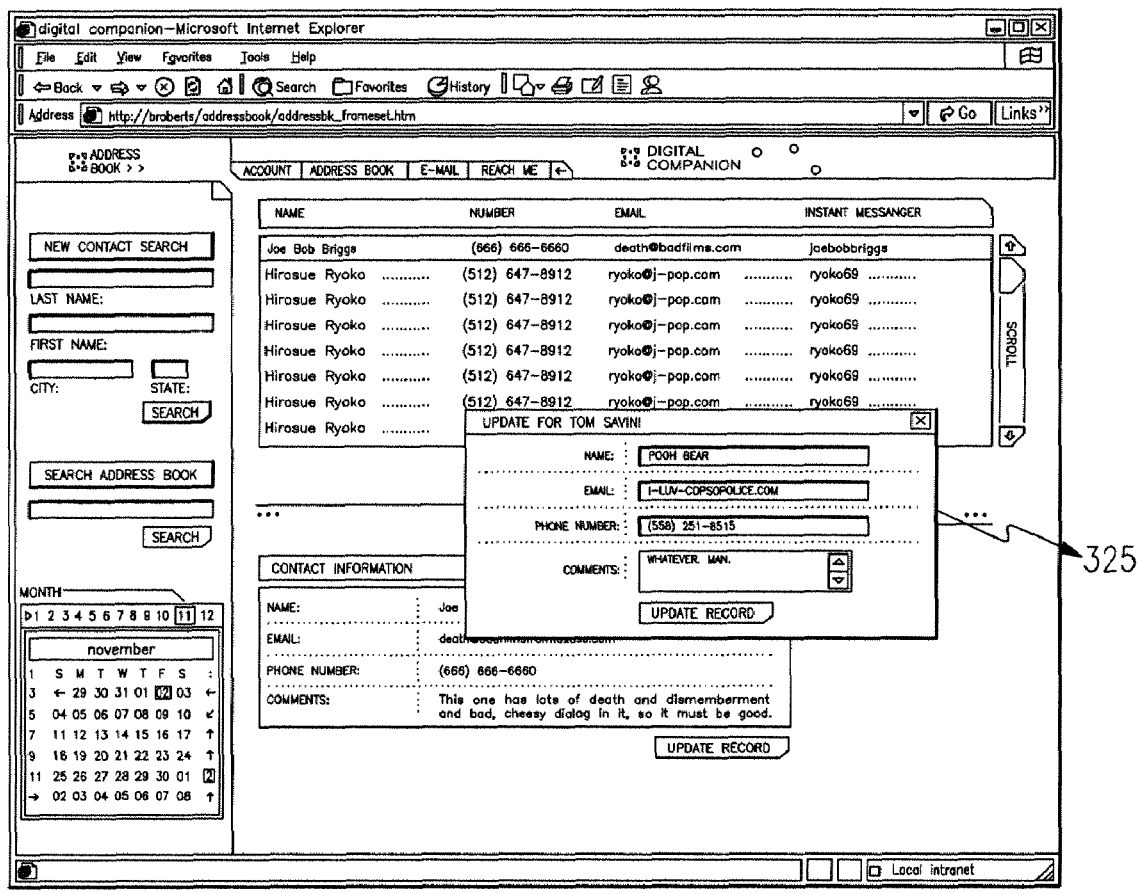

As shown in FIG. 3e, the screen shot shows the user interface of FIG. 3c with a pop-up window 325 that provides a number of inputs to modify contact information for a person in the address book. Pop-up window 325 is shown to update a record for "TOM SERVINI" using, e.g., "NAME", "EMAIL", and "PHONE NUMBER" inputs. Pop-up window 325 may also provide a "COMMENTS" window for the user to input a comment.

Figure 3F:
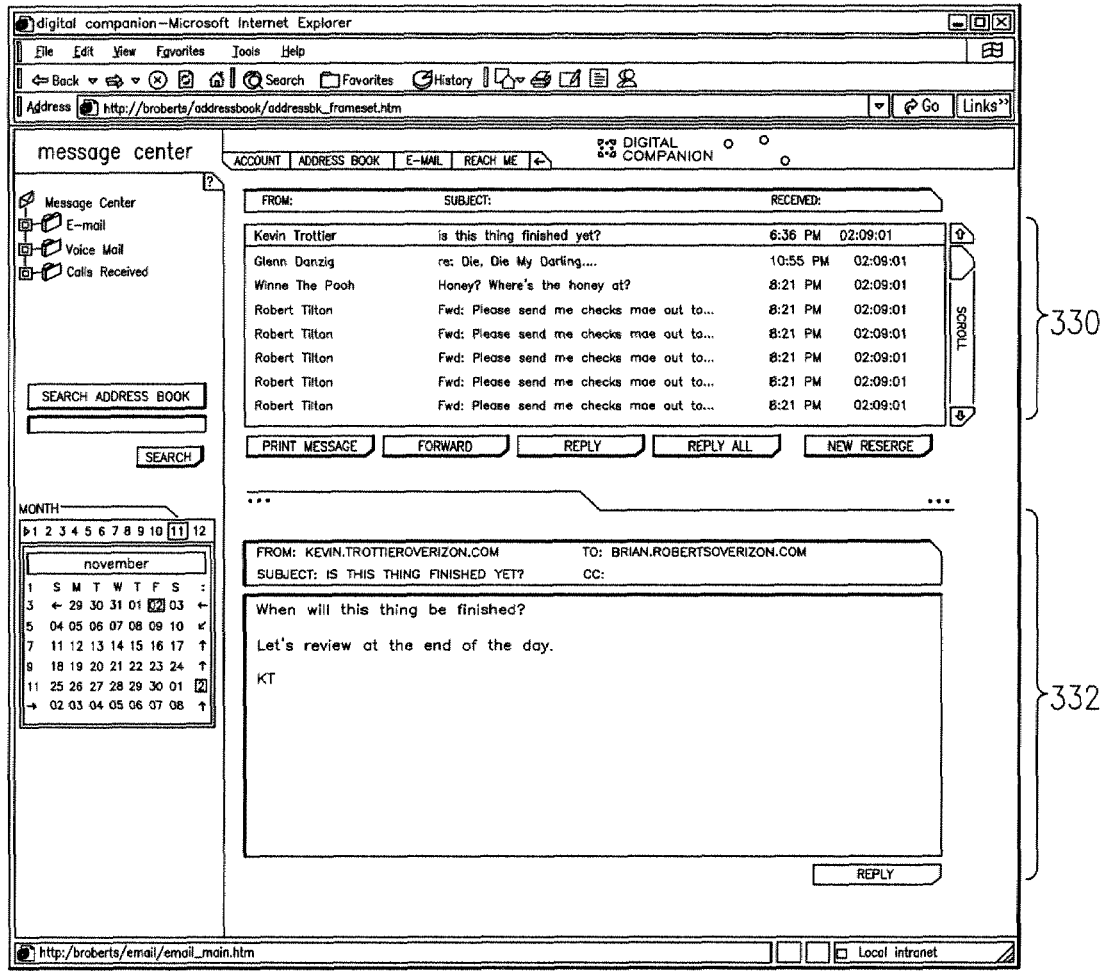

As shown in FIG. 3f, the screen shot shows a user interface for a message center panel having a summary portion 330 that lists messages received in a "RECEIVED:" column, the subject of the received messages in a "SUBJECT:" column, and the name of the persons who sent the messages in a "FROM:" column. Summary portion 330 may also provide other types of information such as the date/time the message was received, the data size of the message, or an attachment indicator. Additionally, summary portion 330 may provide a summary of recent e-mails or instant messages received by the user. Summary portion 330 also provides a number of options to process the messages. For example, the user may select a "PRINT MESSAGE", "FORWARD", "REPLY", "REPLY ALL", or "NEW MESSAGE" option for the listed messages in summary portion 330. The screen shot also shows a detail view portion 332 that provides the details of a selected message. For example, the details of an email message from "KEVIN.TROTTIER" are shown. Detail view portion 332 also provides a "REPLY" option to reply to the viewed message.

Figure 3G:
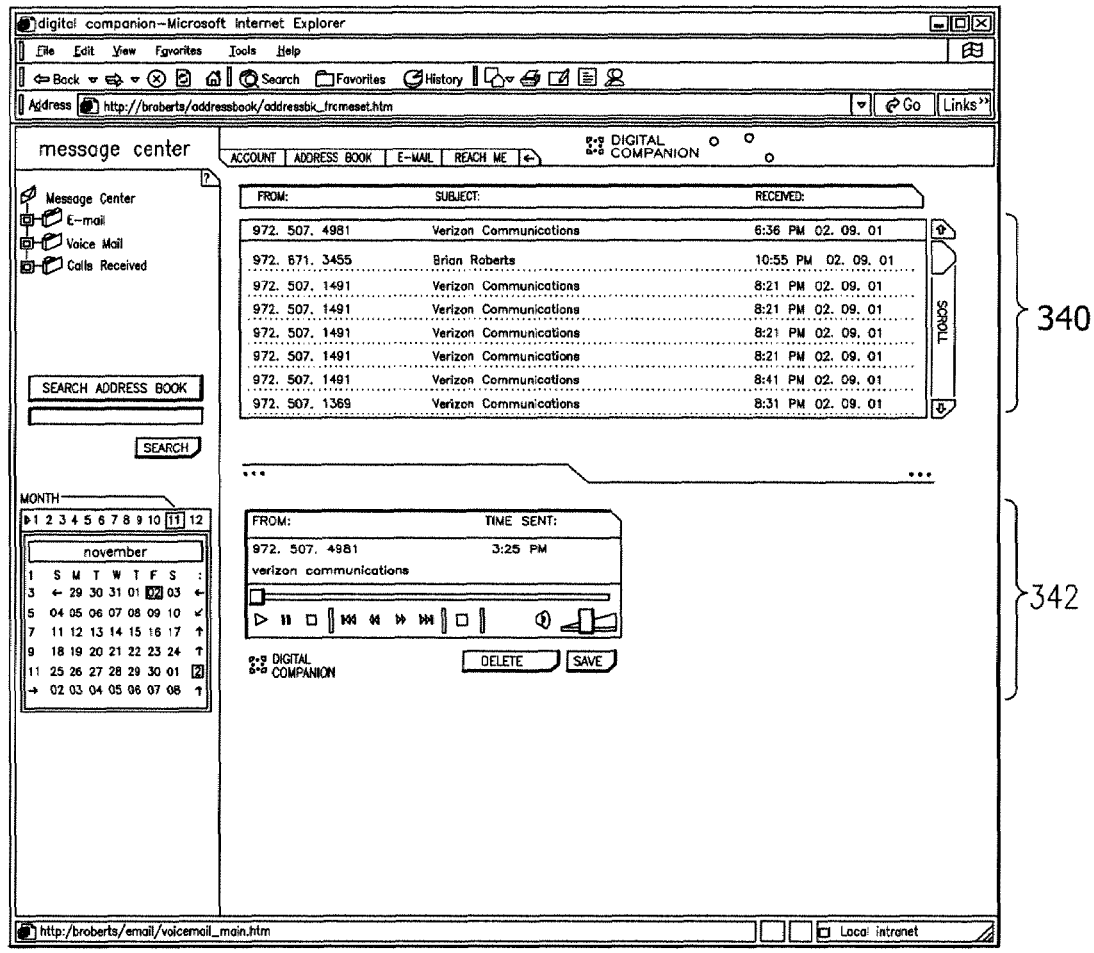

As shown in FIG. 3g, the screen shot shows a user interface for a message center panel having a summary portion 340, which is similar to summary portion 330 of FIG. 3f. Summary portion 340 provides summary information applicable to voice mails in a "NUMBER:", "FROM:" and "RECEIVED:" column. The screen shot also shows a detail portion 342 that allows a user to playback the voice message. Detail portion 342 also allows the user to "DELETE" or "SAVE" the voice message.

Figure 3H:
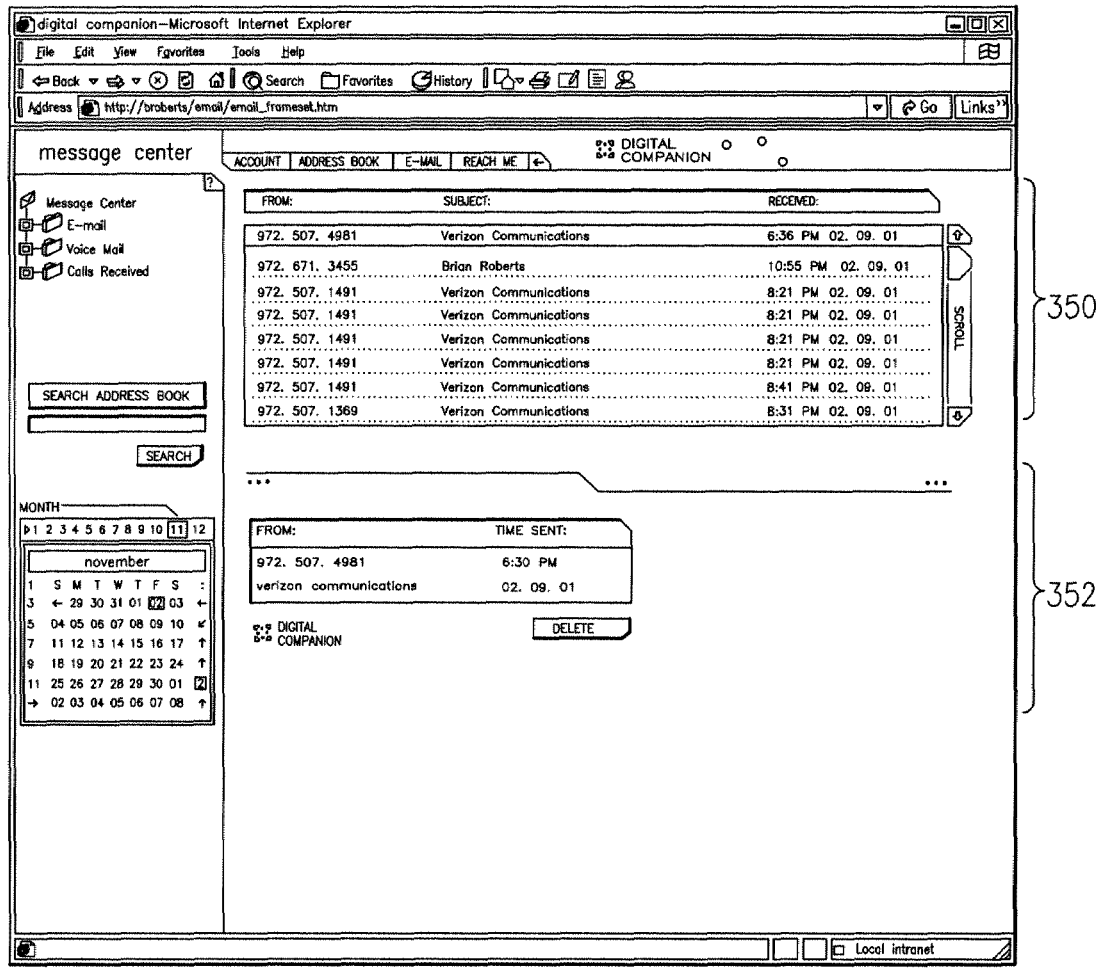
Figure 3I:
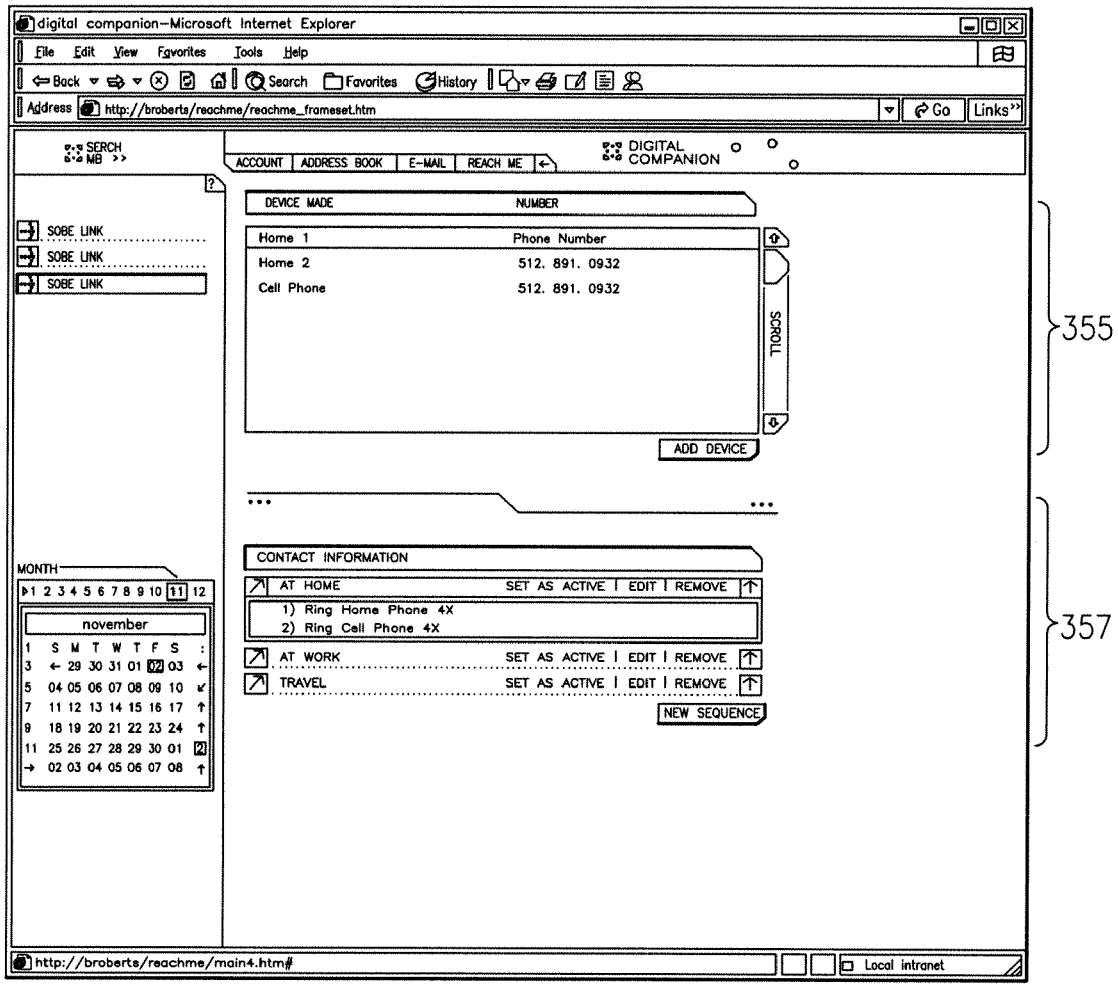

FIG. 3h shows a screen shot of a message center panel having a message summary list portion 350 that lists a summary of messages received. The screen shot also shows a message detail portion 352 that displays detail of a message. FIG. 3i shows a screen shot of a user interface having a device summary portion 355 that lists the devices in use by the user and a device detail portion 357 that allows the user to configure a particular device. For example, the user may configure the number of times to ring the "HOME 1" or "CELL PHONE" device.

Figure 3J:
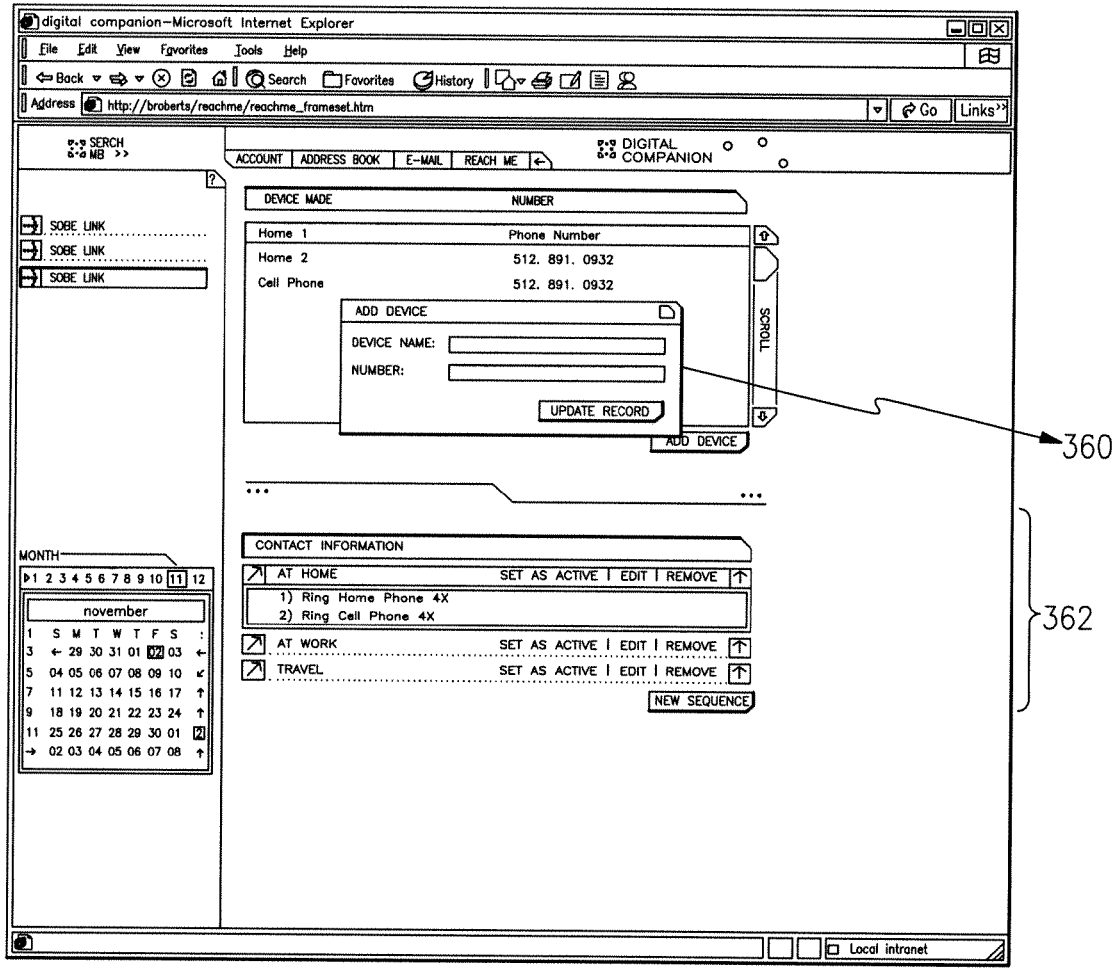
Figure 3K:
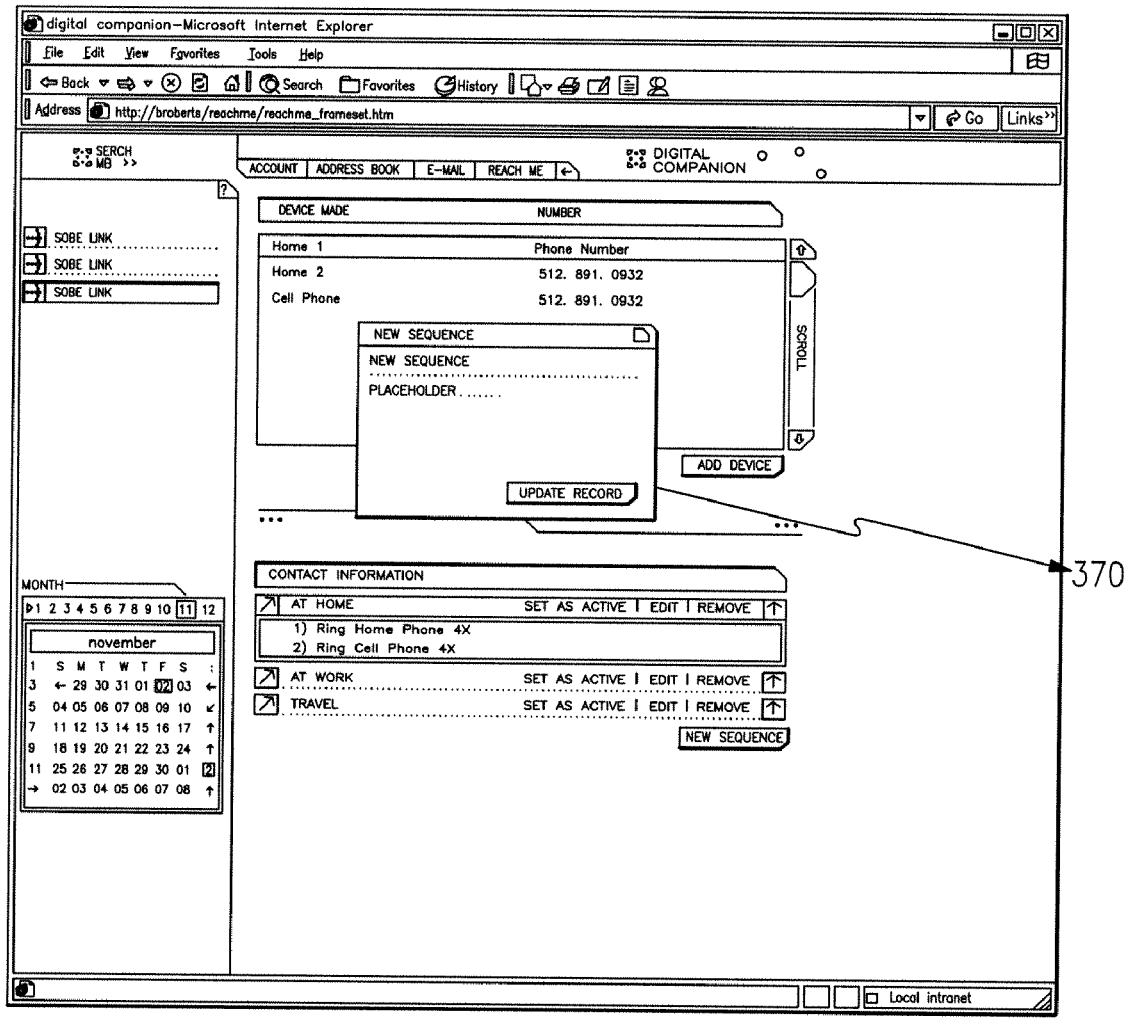
Figure 31:
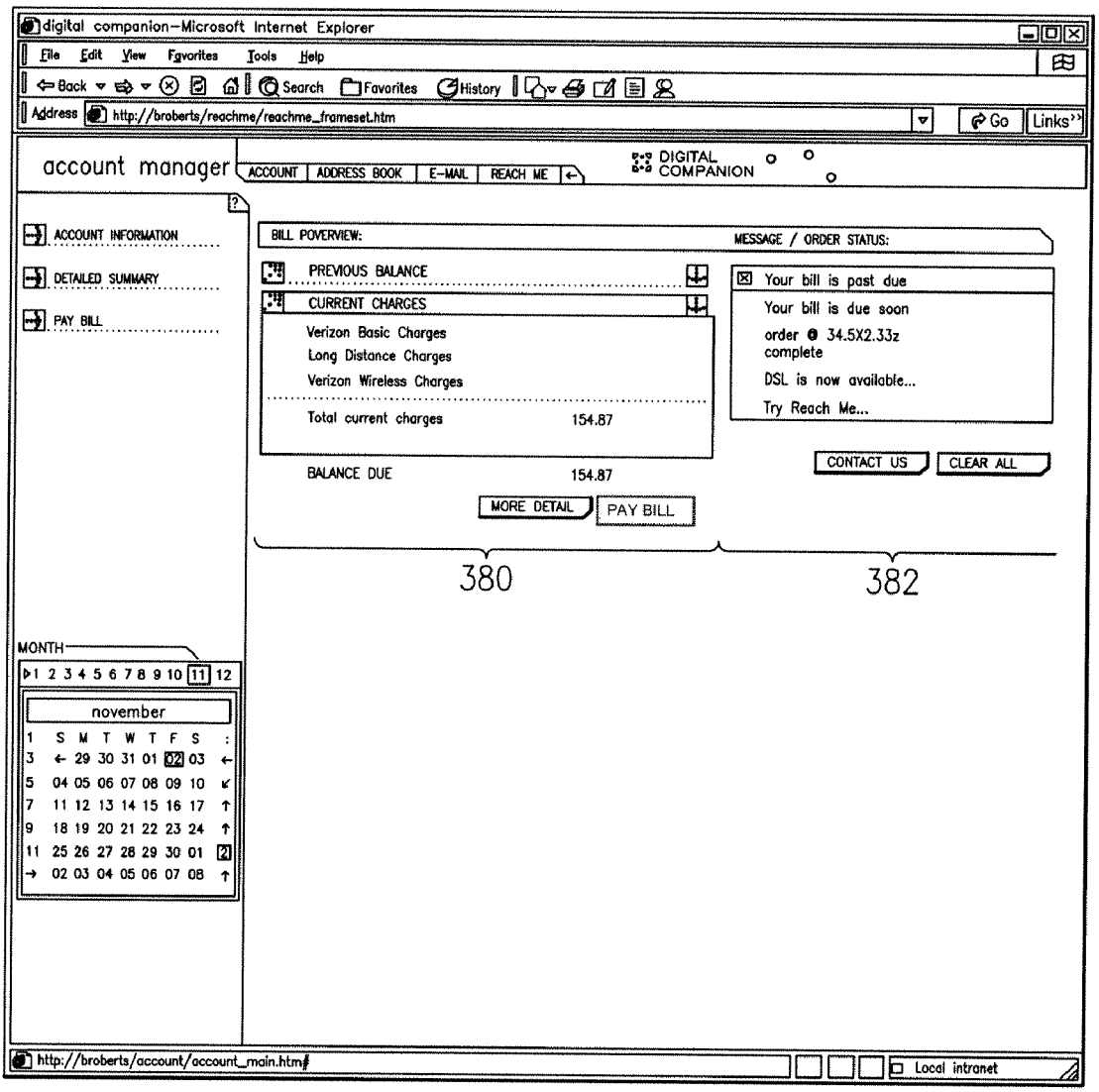

FIG. 3j shows a screen shot of the user interface of FIG. 3i having a pop-up window 360 for adding a device. The screen shot also shows a detail portion 362, which is similar to detail portion 357 of FIG. 3i. FIG. 3k shows a screen shot of the user interface of FIG. 3i having a pop-window 370 that provides an "UPDATE RECORD" option for a user to modify the sequence of devices being called.

FIG. 3l shows a screen shot of a user interface for account management having an overview portion 380 allow a user access to summary information regarding a user's account. For example, overview portion 380 a user to access "PREVIOUS BALANCE", "CURRENT CHARGES", "BASIC CHARGES", "LONG DISTANCE CHARGES", and "WIRELESS CHARGES" summary information. The screen shot also shows a message portion 382 displays messages regarding the user's account. For example, a message such as "Your bill is past due" can be displayed in message portion 382.

Figure 3M:
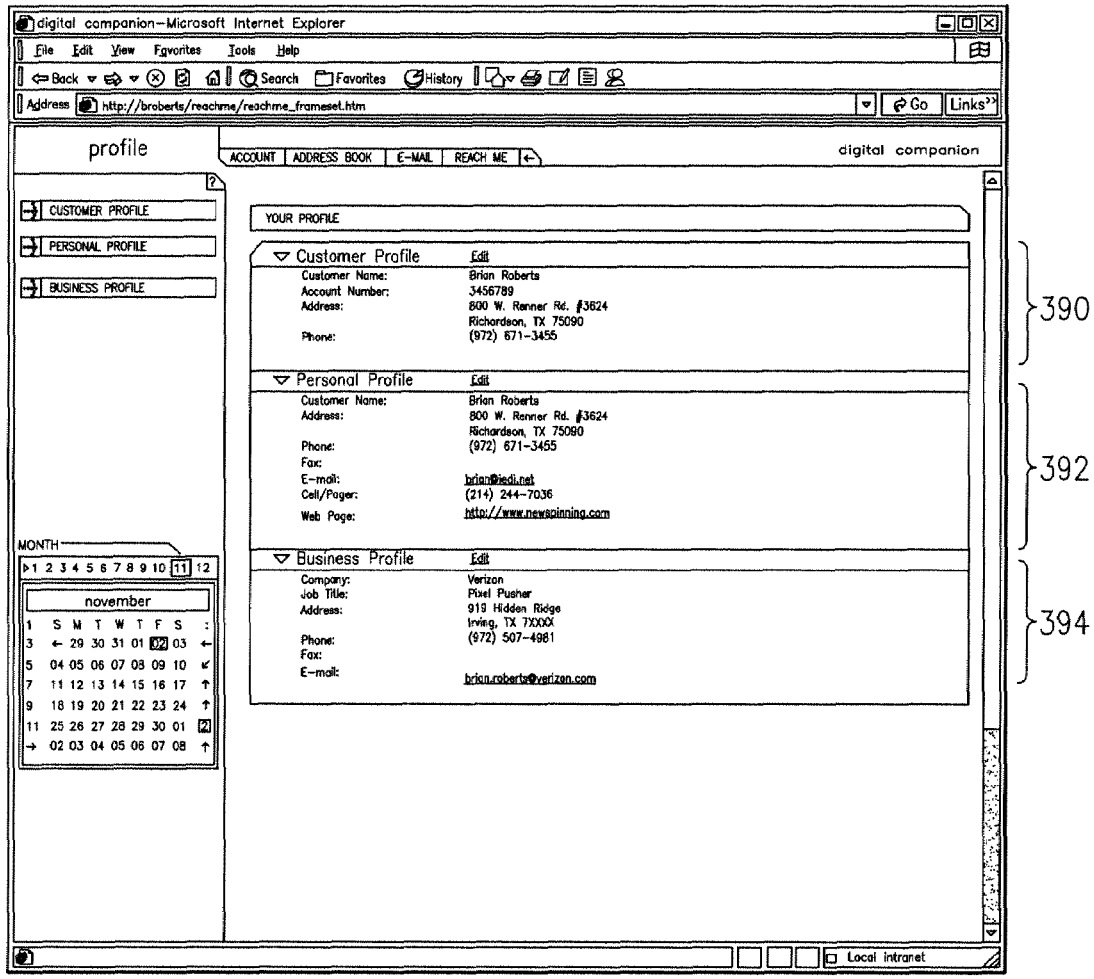

FIG. 3m shows a screen shot of a user interface for profile management having a customer profile portion 390, which displays a customer's profile. The customer's profile may include information such as "Customer Name:", "Account Number:", "Address" and "Phone:" information. The screen shot also shows a personal profile portion 392 that displays a user's personal profile. The personal profile may include "Name:", "Address", etc. information. The screen shot also shows a business profile portion 394 that displays a business profile. The business profile may include information such as "Company", "Job Title:" etc. information. These profiles can be kept confidential and updated to include any other type of profile information.

Figure 4:
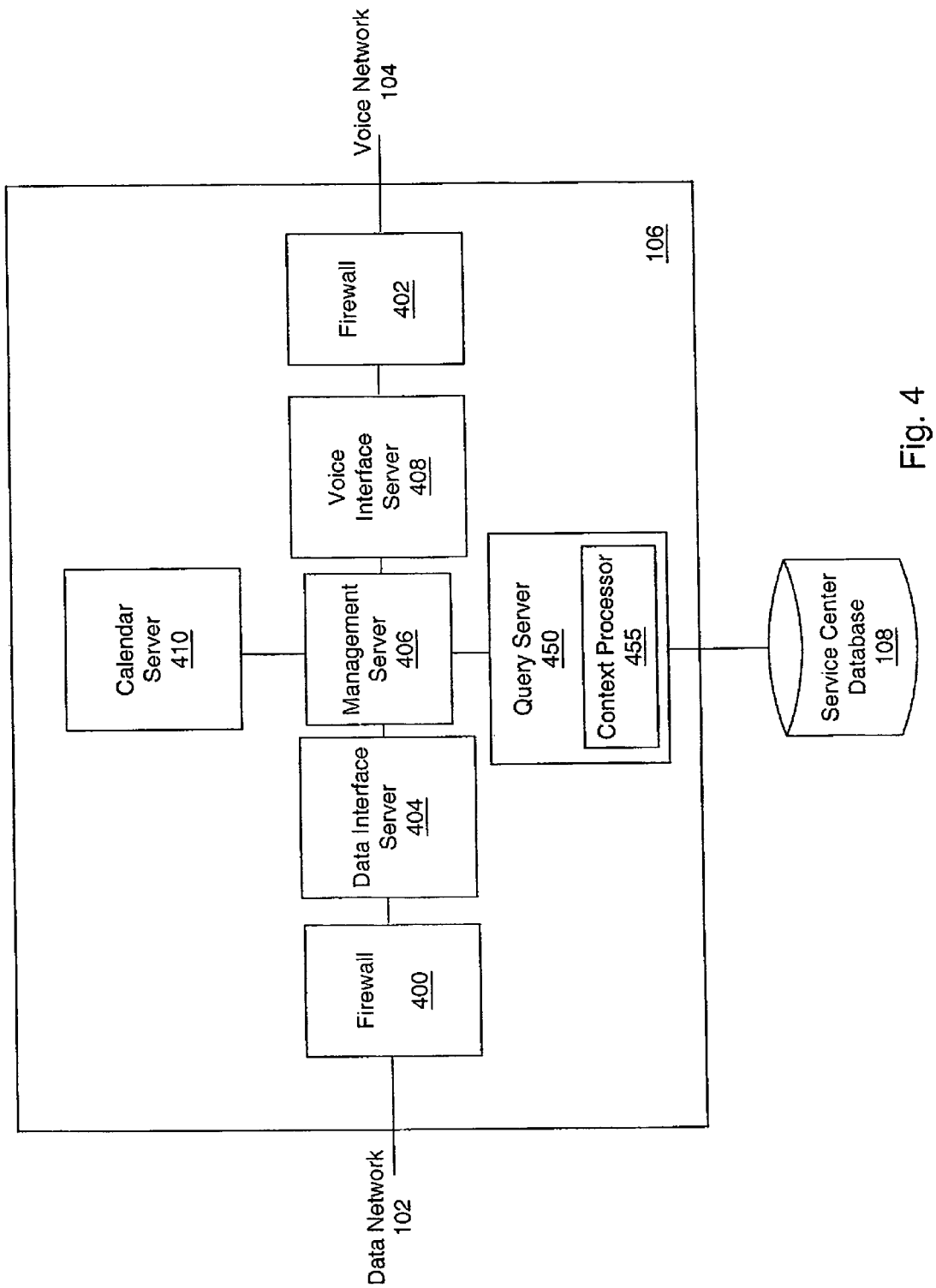
FIG. 4 is a block diagram of a service center, in accordance with methods and apparatus consistent with the principles of the present invention.

FIG. 4 is a block diagram of a service center, in accordance with methods and apparatus consistent with the principles of the present invention. As shown, service center 106 includes firewalls 400 and 402, a data interface server 404, a management server 406, a voice interface server 408, a calendar server 410, and query server 450.

Firewalls 400 and 402 provide security services for communications between service center 106 and data network 102, and between service center 106 and voice network 104, respectively. For example, firewalls 400 and 402 may restrict communications between data terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and data terminal 112. For example, data interface server 404 may exchange TCP/IP communications, such as IM communications or XML information which include call forwarding patterns from user 110. Data interface server 404 may also interface proxy 124 to indirectly exchange communications with data terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Calendar server 410 provides services to calendar application 220 on data terminal 112. For example, calendar server 410 may provide email services, directory services, and calendar information, such as schedule information, to data terminal 112. Calendar server 410 may operate in conjunction with data interface server 404 to exchange, for example, call forwarding patterns with data terminal 112.

Query server 450 provides context based querying services over data network 102 or voice network 104 by providing access to service center database 108. Directory database provides information related to contact information including, phone numbers, email addresses, etc., similar to information included in a phone book. For example, in one embodiment query server 450 and service center database 108 provide an on-line query tool for the Verizon Superpages$^{SM}$ query tool accessible at a website, e.g., www.verizon.com. Query server 450 may be implemented as a web server using known hardware and software. Directory database may be implemented, e.g., as an Oracle™ database. Although query server 450 is shown with a direct connection to service center database 108, any number of intervening devices, such as, hubs, routers, servers, firewalls, etc., may also be interposed between query server 450 and service center database 108.

Query server 450 may also include a context processor 455 to determine the context of each query. A context of a query may be determined based upon the identity of the user making the query and the circumstances surrounding the query. For example, the context may be determined based upon information contained in service center database 108 such as: a user's home address; a user's work address; a user's home phone number; a user's employer; a history of recent queries by a user; a history of calls made by a user; or a history of calls received by a user. The context may also be determined based upon information provided from SCP 600. Once determined, the context is used by query server 450 in addition to the search criteria of the query to narrow the domain of search in service center database 108. For example, a query with search criteria requesting the phone number of "John Smith" may be limited to a context of only those Smiths in Boston based upon the area code of a user's home phone number. As another example, Caller-ID information received from SCP 600 may indicate that user 110 has received numerous calls in the Boston area and, thus, context processor 455 may determine that user 110 is located in Boston and use the Boston area as the context.

When submitting a query, query server 450 may also use various authentication schemes, e.g., a user ID and password, to prevent an unauthorized person from impersonating user 110. Other security measures, such as encryption, are also consistent with the principles of the present invention. Once authenticated, context processor 455 may then limit the domain of search for a query and/or allow access to private information to which user 110 is authorized to access. For example, based on the login and password, context processor 455 may allow user 110 to query for private home phone numbers, e.g., of a friend, in a particular city.

Context processor 455 may continuously maintain a context for user 110 by dynamically monitoring the behavior of user 110. For example, a subsequent query from user 110 requesting the phone number for a Joe's Pizza may be limited to those restaurants in Boston based upon the recent history of previous queries by user 110. The context of a query may be dynamically determined based upon data provided in call signaling, such as, automatic number identification (ANI) information or signaling system 7 (SS7) messages, e.g., from SCP 600. However, any of a wide variety of algorithms and information for determining the context of a query is in accordance with the principles of the present invention.

Context processor 455 may be implemented as hardware or software within query server 450. For example, in one embodiment context processor 455 is implemented as a daemon process executed as part of the software for query server 450.

User 110 may submit a query to query server 450 via either voice network 104 or data network 102. For example, user 110 may use phone 114 to call a directory assistance service which may then establish a session with query server 450 via service center 106 to process the query.

In an alternative, user 110 may use a user terminal 112 to access query server 450 over data network 102. User terminal 112 may be implemented using internet appliances such as the Blackberry™, and Ergo Audrey™. Similarly, user terminal 112 may be implemented using pagers, wireless phones (with data access functions), web browsers, Personal Digital Assistants ("PDA") with network connections, and any device capable of browsing the Internet. User terminal 112 may also include an application, such as, a web browser, general purpose, or custom software programs. User terminal 112 may communicate with query server 450 using known communications protocols over data network 102. For example, query server 450 may use XML to communicate with user terminal 112.

Although FIG. 4 shows separate servers within service center 106, service center 106 may be implemented using any combination of hardware and software. For example, service center 106 may implement data interface server 404, management server 406, voice interface server 408, calendar server 410, and query server 450 as software applications installed on a single machine. In addition, service center 106 may access one or more servers remotely across a network.

FIG. 5 illustrates a record table 500 containing information stored in a service center database 108 used by the query server 450 consistent with methods and apparatus consistent with the present invention. Table 500 includes a User ID column 502, a current location column 504, a recent incoming calls column 506, a recent outgoing calls column 508, and a recent query results column 510.

User ID column 502 identifies one or more users associated with the service center 106. For example, a user ID may be used to determine an account for phone 114 from which a request is being made. In addition, user ID column 502 allows query server 450 to correlate multiple recent events with a particular user.

Current location column 504 identifies the location from which the user is making a request. This location can include user terminal 112, home phone 114, office phone 116 or mobile phone 118.

Recent incoming calls column 506 indicates the phone number from which a user has received calls. Recent outgoing calls column 508 indicates the phone numbers to which the user has made calls. Recent query results column 510 indicates the results of recent queries made by the user. These recent calls and results can be used to analyze calling patterns to provide more targeted results.

Figure 6:
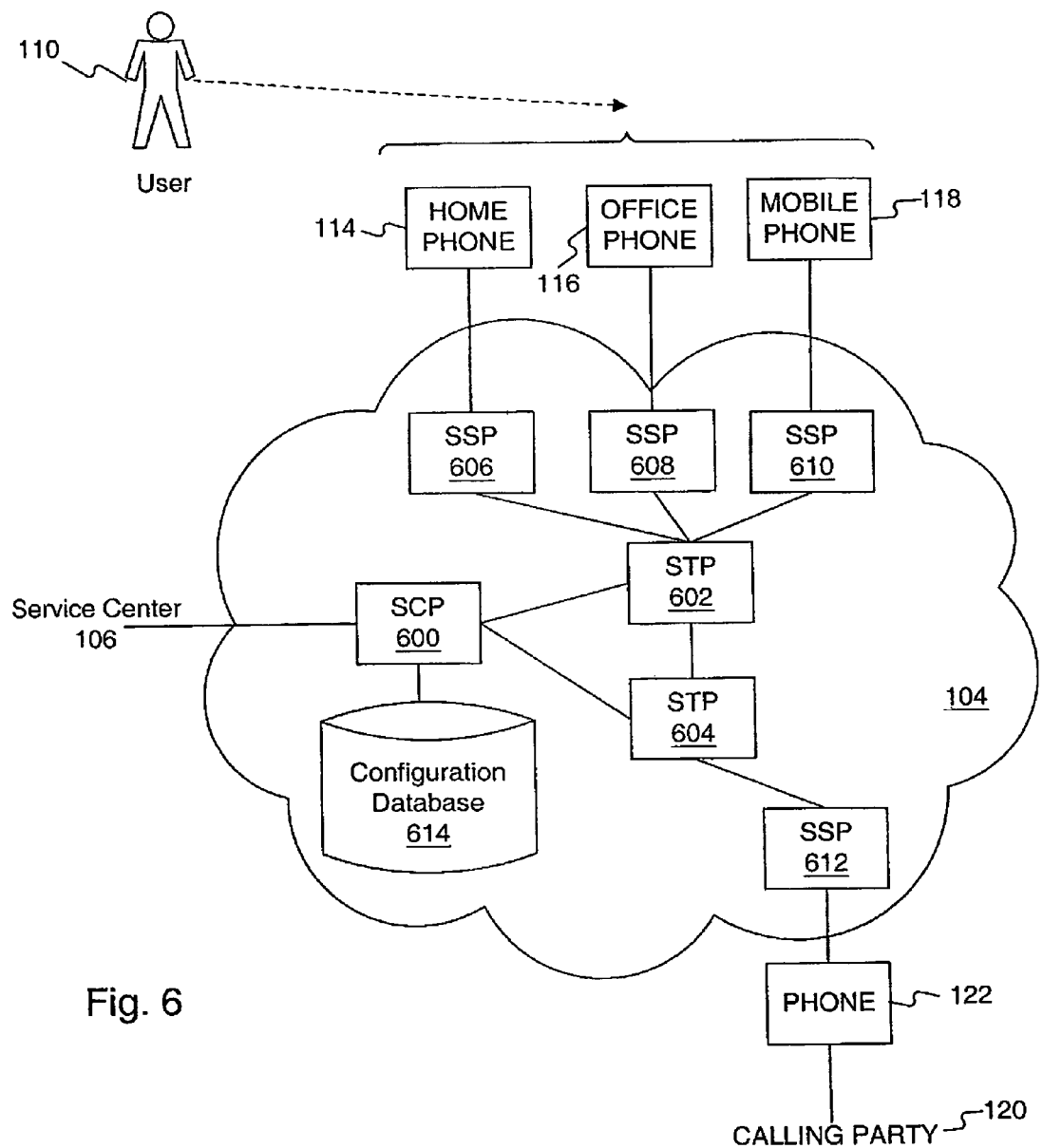
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services between voice interface server 408. SCP 600 provides translation and routing services of SS7 messages to support the features of voice network 104, such as call forwarding. In addition, SCP 600 may exchange information voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TCAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STP 602 may route SS7 messages between SSPs 606, 608, 610, and 612. STP 602 and 604 may be integrated as adjunct to an SSP, e.g., SSPs 606, 608, 610, and 612, or may be implemented as a separate machine. In addition, STP 602 and 604 may provide security functions, such as security checks on incoming/outgoing SS7 messages. STP 602 may also provide other functions, such as acquisition and storage of traffic/usage statistics. STP 602 may be implemented using known hardware and software from manufacturers such as NORTEL.TM. and LUCENT Technologies.TM.

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 6104 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
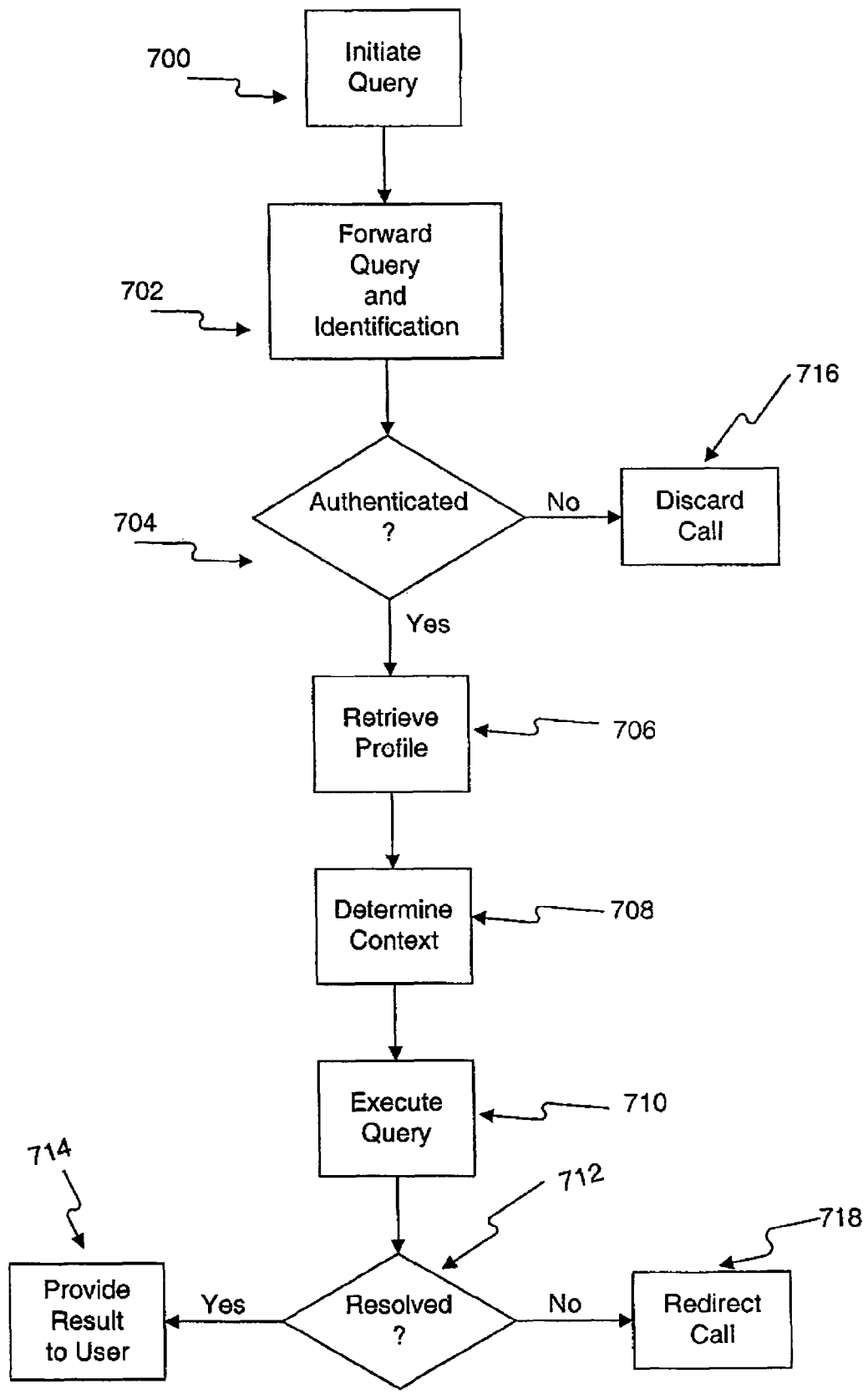
FIG. 7 is a flow diagram of performing a context based query, in accordance with methods and apparatus consistent with the principles of the present invention.

FIG. 7 shows a flow diagram of performing a context based query, in accordance with methods and apparatus consistent with the principles of the present invention. User 110 initiates a query (step 700). To initiate a query, user 110 can send a request to query server 450 for the phone number of a desired call destination. This query may be initiated via the voice network or the data network. For example, user 110 can initiate the query by making a call to service center 106. User 110 can provide identifying information and parameters for the query to service center 106. Service center 106 then translates the user provided information, e.g., using voice recognition algorithms, and forwards the user's identifying information and query parameters to query server 450. Alternatively, user 110 may provide identifying information and parameters of the query via user terminal 112 to data network 102, such as accessing a website on the Internet, e.g., www.verizon.com.

The identifying information and the parameters of the query are forwarded to query server 450, e.g., from service center 106 or user terminal 112 (step 702). The identifying information may include a variety of information. For example, the identifying information may include: a user's name; address; phone number; email address; or password. In addition, information from service center database 108 may also be included in the identifying information.

The identification information is authenticated (step 704). For example, query server 450 determines that user 110 is a registered user of the query service. This authentication may be based upon a password or personal identification number, or looking up the identification information in service center database 108. If user 110 is not a registered user then query server 450 discards the request (step 716).

If user 110 is a registered user, then context processor 455 retrieves the profile of the user from service center database 108 (step 706). For example, the user's profile may indicate he/she resides in Boston, Mass. and often searches for phone numbers in Waltham, Mass.

Context processor 455 uses the profile information to determine the context of the query (step 708). The context of a query may be determined based upon the identity of the user making the query and the circumstances surrounding the query. For example, if the user's profile indicates he/she resides in Boston and often searches in Waltham, then the context may limit the query to Boston and Waltham. A query with search criteria requesting the phone number of a John Smith may be limited to only those Smiths in Boston based upon the context of a query from a person residing in Boston. As another example, a query requesting the phone number for a Joe's Pizza may be limited to those restaurants in Waltham based upon the recent history of other queries submitted by the user.

Query server 450 executes the query, where it searches, based on context, for a result to the query (step 710). Query server 450 determines if the query has been resolved (step 712). Resolution can be achieved by finding a relatively small number of matches for the query parameters and the context. These numbers may be configured by user 110 or may vary based upon information requested in the query.

If the query cannot be resolved, then user 110 may be redirected (step 718). Query server 450 may determine that the query cannot be resolved when the number of candidate results is greater than a threshold number or there a 0 candidate results found. The threshold number may be configured by user 110, set according to a default by query server 450 (or by service center 106), or varied based upon the information requested in the query. For example, user 110 may be redirected to a calling center where an operator can request further information from user 110. Alternatively, query server 450 may request additional information from user 110 in order to resolve the query.

If the query is resolved, then the result of the query, e.g., the phone number of a call destination, is provided to user 110 (step 714). In addition, query server 450 may provide several of the candidate results to provide user 110 more information regarding the query. Other known techniques for providing query results such as relevance ranking may also be used. Other known techniques for providing query results such as relevance ranking may also be used. The user may have the call automatically initiated to the call destination (step 718) or hang up and manually contact call destination directly. Query server 450 may also provide the result via data network 102, such as using an E-mail, a web page, instant message, etc. Furthermore, query server 450 may determine that the result should only be conditionally provided to the user. For example, in the event the result of the query is a private listing such as an unlisted home phone number, or a person's direct extension at work, query server 450 may request additional authentication information from user 110 or refer to a list in service center database 108 that indicates user 110 is approved to receive the listing. If query server 450 approves user 110 to receive the result, then the result is provided to user 110. If server query server 450 does not approve user 110, then the session of user 110 may be redirected or dropped.

Although specific components of the present invention have been described, one skilled in the art will appreciate that the methods and apparatus consistent with the present invention may contain additional or different components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving a query request to find information for a destination from a user;
   determining a context for the query request using previously stored information associated with the user, including at least one of incoming calls to the user and outgoing calls to the user, the context for the query request indicating a geographic location of the user;
   obtaining information from a directory, the information related to the destination and based on the query request and the context of the query request; and
   providing the obtained information to the user.

2. The method of claim 1, wherein obtaining information from the directory includes: determining a plurality of candidates stored in the directory satisfying the query request; and determining at least one of the plurality of candidates being consistent with the context of the query request.

3. A processor-readable medium storing instructions executable by a processor and configured to perform the method of claim 1 when executed by the processor.

4. A method, comprising:
   receiving an information request from a requester, the information request including query parameters;
   comparing requester identifying information to previously stored subscriber information to determine whether the requester is a service subscriber;
   determining a context for the information request when it is determined that the requester is a service subscriber, wherein the context is determined based at least in part on the previously stored subscriber information, and wherein the context indicates a geographic location associated with the information request;
   searching stored directory information using the query parameters and the context to identify matching directory information of the stored directory information;
   providing a response to the requester, the response including the matching directory information.

5. The method of claim 4, wherein the requester identifying information is obtained using a caller ID lookup.

6. The method of claim 4, wherein receiving the information request from the requester includes: receiving a message from the requester over a data network from a terminal associated with the requester.

7. The method of claim 4, wherein providing the response to the requester includes: sending a message to the requester over a data network to a terminal associated with the requester.

8. The method of claim 7, wherein the message is provided using a web page.

9. The method of claim 4, wherein the stored directory information includes information related to contact information.

10. The method of claim 4, wherein the previously stored subscriber information includes at least one of a subscriber home address, a subscriber work address, a subscriber home phone number, and recent information requests by the subscriber.

11. The method of claim 4, wherein the context is further determined based at least in part on call signaling messages.

12. The method of claim 4, further comprising: obtaining the requester identifying information over a data network.

13. A processor-readable medium storing instructions executable by a processor and configured to perform the method of claim 4 when executed by the processor.

14. A system comprising:
a subscriber database storing subscriber information;
a directory database storing information related to contact information for a plurality of destinations; and
a server system, communicatively coupled to the subscriber database, the directory database, and a data network over which the server system may receive an information retrieval request containing query parameters from a requester, the server system including
a context processor configured to determine context information associated with the information retrieval request, the context information including a geographic location associated with the information retrieval request, and
a query server coupled to the context processor and configured to receive the information retrieval request, determine identification information associated with the requester, determine whether the requester is a subscriber using the identification information and the subscriber database, and when the requester is a subscriber
retrieve subscriber information of the requester from the subscriber database,
obtain the context information from the context processor, provide a query request to the directory database, the query request including the query parameters and the context information,
obtain a response to the query request from the directory database, and
provide the response to the requester, wherein the context information is determined at least in part based on the subscriber information of the requester.

15. The system of claim 14, wherein the subscriber information of the requester includes at least one of a subscriber home address, a subscriber work address, a subscriber home phone number, and recent information requests by the subscriber.

16. The system of claim 14, wherein the subscriber information of the requester includes at least one of incoming calls to the subscriber and outgoing calls to the subscriber.

17. The system of claim 14, wherein the query server is further configured to provide the subscriber information of the requester to the context processor.

18. The system of claim 14, wherein the response includes contact information for at least one of the plurality of destinations.

19. The system of claim 14, further comprising: the data network.

20. The system of claim 14, wherein the server system further includes a web server, and wherein the response is provided to the requester via the data network using a web page.

* * * * *